United States Patent [19]

Shaver, Jr. et al.

[11] Patent Number: 5,276,662
[45] Date of Patent: Jan. 4, 1994

[54] DISC DRIVE WITH IMPROVED DATA TRANSFER MANAGEMENT APPARATUS

[75] Inventors: Jimmie R. Shaver, Jr., Yukon, Okla.; Dhiru Desai, San Jose, Calif.

[73] Assignee: Seagate Technology, Inc., Scotts Valley, Calif.

[21] Appl. No.: 955,366

[22] Filed: Oct. 1, 1992

[51] Int. Cl.$^5$ ............................................. G11B 17/22
[52] U.S. Cl. ........................................ 369/32; 369/48; 369/53
[58] Field of Search ................ 369/32, 48, 59, 53, 369/30, 44.37, 44.28; 360/72.2, 48; 379/88; 364/514

[56] References Cited

U.S. PATENT DOCUMENTS 5,034,914 7/1991 Osterlund .................... 369/32 X
5,161,143 11/1993 Fukushima et al. ............... 369/53

Primary Examiner—Robert J. Pascal
Assistant Examiner—Ali Neyzari
Attorney, Agent, or Firm—Edward P. Heller, III; Bill D. McCarthy; Louis W. Watson

[57] ABSTRACT

A data transfer circuit for coordinating transfer of data between a host and a disc of a disc drive having a state machine for coordinating with a buffer controller to transfer data between the host and a buffer segment and a second state machine for coordinating with the buffer controller to transfer data between the buffer segment and a disc of the disc drive. Counting circuits count the number of bytes transferred between the host and the buffer segment and between the buffer segment and the disc and provide sector count signals each time a sector of data is transferred into or out of the buffer segment. The sector count signals are received by a buffer manager which includes counters for counting sectors of data transferred into and out of the buffer segment and a comparator circuit that compares the contents of the buffer manager counters to provide a code indicative of the state of the buffer segment to a decoder. The decoder provides pause signals to the state machines to suspend data transfers from the source, host or disc, of data when the buffer segment is filled to capacity and to suspend transfers to the receiver, host or disc, of the data when the buffer contains no data which has not been previously transferred to the receiver.

10 Claims, 8 Drawing Sheets

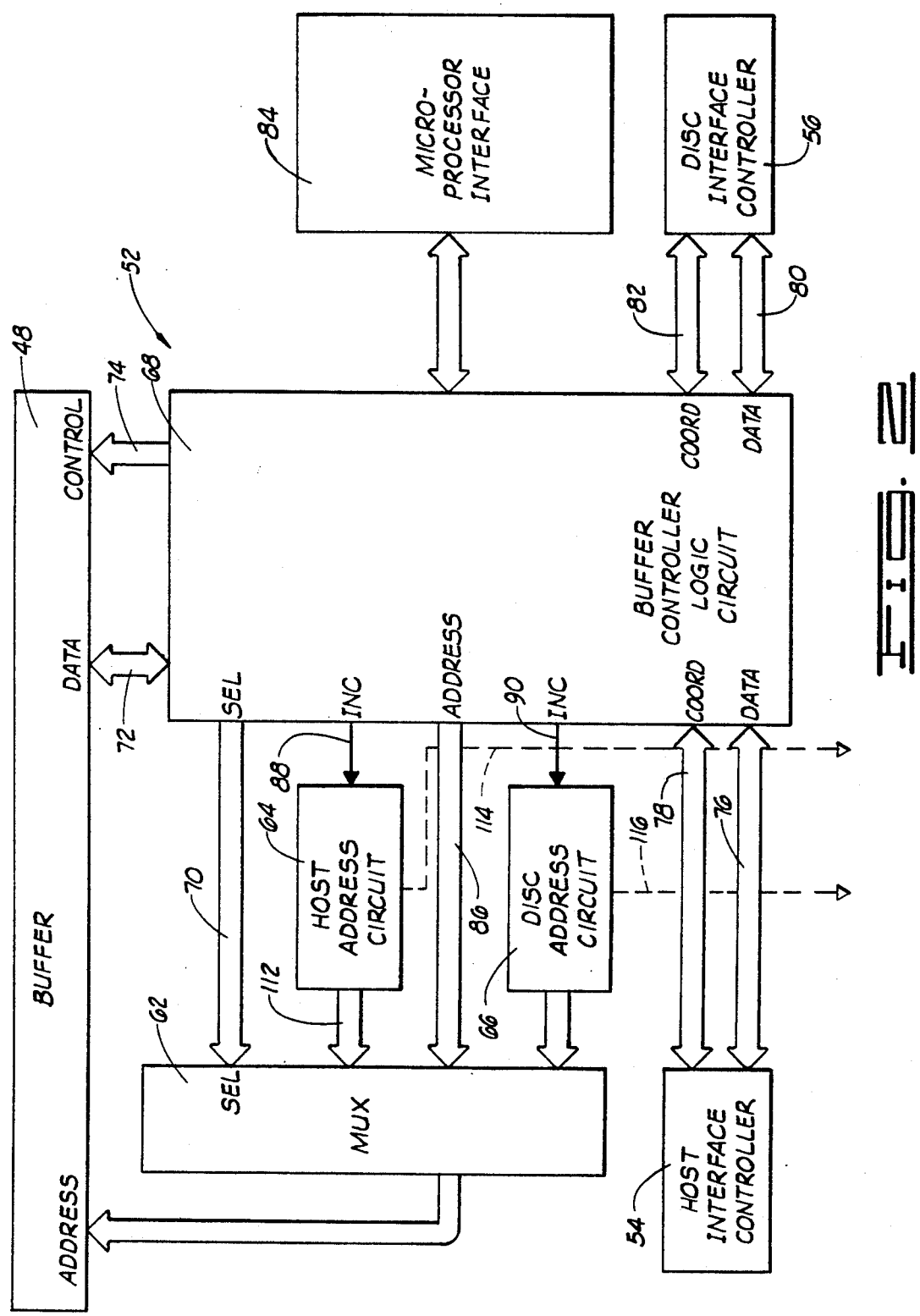

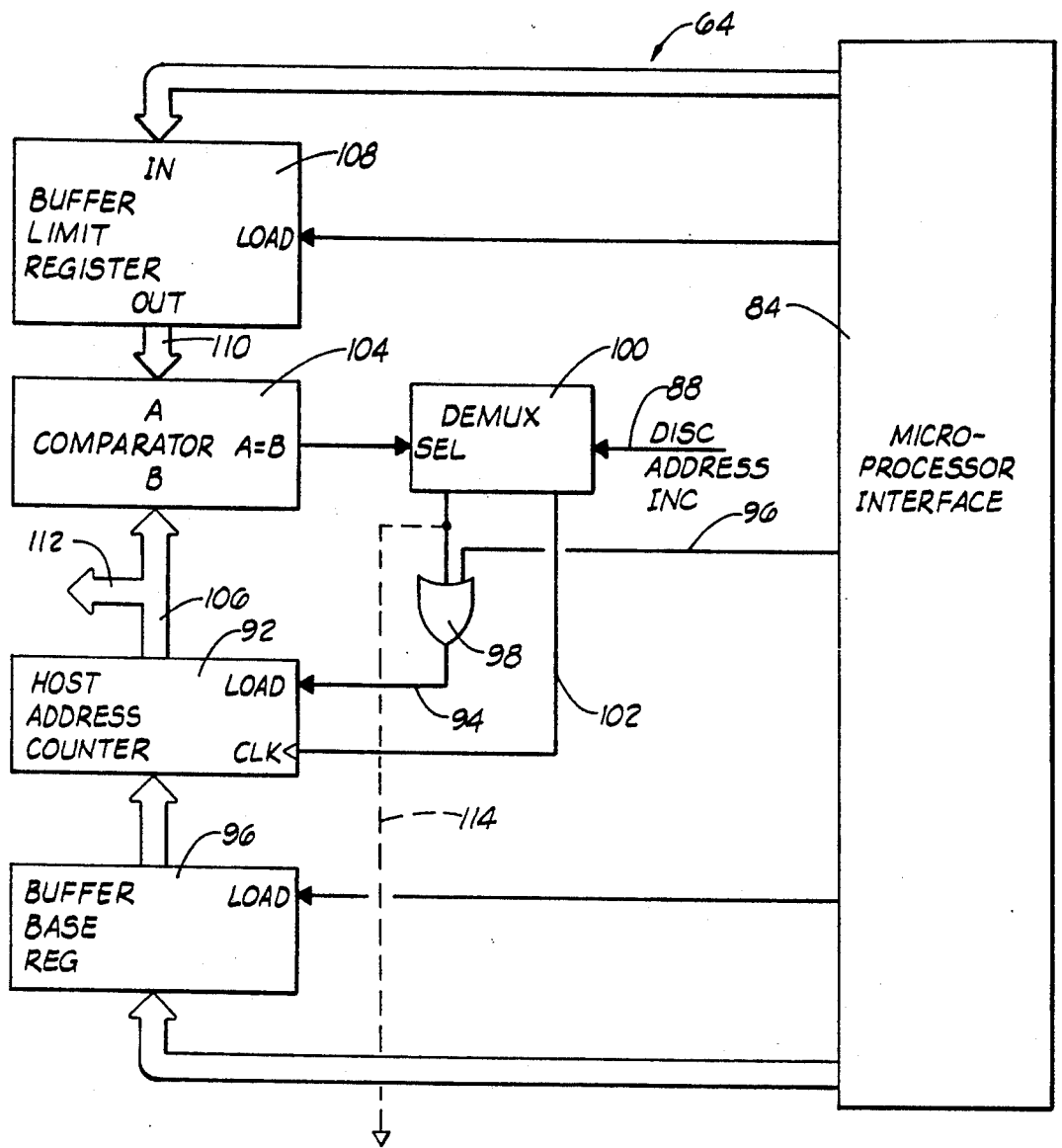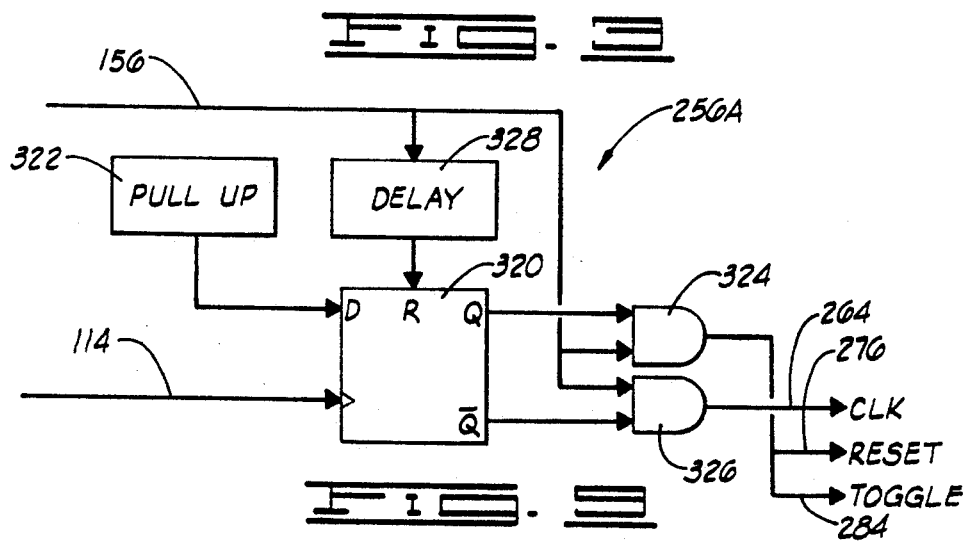

DISC DRIVE WITH IMPROVED DATA TRANSFER MANAGEMENT APPARATUS

BACKGROUND OF THE INVENTION

1. Field of the Invention

The present invention relates generally to improvements in data transfer systems and, more particularly but not by way of limitation, to improvements in apparatus for controlling the transfer of data between a host computer and discs of a hard disc drive.

2. Brief Description of the Prior Art

In a hard disc drive, files used by a host computer are stored on rotating discs on which are defined a series of concentric data tracks to which data contained in the files is written and from which the data is subsequently read. To this end, the discs are provided with magnetizable surface coatings, and a read/write head capable of magnetizing the surface in either of the two opposite directions along a track is provided for each disc surface to write the data to a selected track in the form of a series of magnetized cells along the track. Data is then recovered, or read, by the generation of emf pulses in the read/write head as boundaries between cells pass the head.

The data in a file is made up of a series of data characters, each corresponding to a particular pattern of bits, so that, at a microscopic level, the cells along a data track correspond generally to the series of bits that make up the individual characters of which a file is composed. (As is known in the art, the data is encoded prior to writing so that the correspondence is only a general one and the stream of emf pulses issuing from the read/write head is similarly decoded to recover the original bits of the data characters.) Thus, at a microscopic level, data in a file is corresponded to magnetized cells along a data track when a file is stored.

At a macroscopic level, the tracks are organized into sectors, each containing a header that identifies the sector, in which a selected number, usually 512, of data bytes are stored. Thus, when a file is be stored, it is divided into data sectors, corresponding to the sectors on the discs, and each data sector is stored at a selected sector on a disc. Thus, at the macroscopic level, reading and writing of files is effected on a sector basis and a file allocation table on the disc maintains a record of the disc sectors at which the file is located.

The transfer of a file between the host and a disc of the disc drive is similarly controlled at two levels, the microscopic level in which cells along a track on a disc are magnetized in relation to the bit structure of the file for subsequent reading and the macroscopic level in which sectors are selected to contain the data sectors into which the file is divided, and sectors of data are channeled to the selected sectors along a track of the disc. To implement this bi-level transfer scheme, a disc drive includes a buffer into which sectors of data are first transferred, either from the host or the disc, and from which the sectors of data are subsequently transferred to the disc or the host. Specifically, a system microprocessor, which is programmed to control the operation of the disc drive as a whole, includes programming for locating sectors at which a file is to be stored or from which a file is to be retrieved and for controlling the transfers at the sector level. At the microscopic, or character, level, transfers are carried out by hardware controllers that include state machines that control transfers of data to and from the buffer on a character by character basis.

Typically, then, transfers of files between the host and discs of the disc drive are carried out in a series of steps under the overall control of the system microprocessor but under microscopic control of the controllers. Thus, for example, at such times that a file is to be written to a disc, the host will provide general information to the system microprocessor, via a host interface controller, that will enable the system microprocessor to determine the sectors to which a file is to be written, and the system microprocessor initiates the transfer by carrying out a series of operations effecting transfer at the sector level. These operations include the issuance of commands to a servo system which controls the radial location of the read/write heads to cause movement of the heads to the track on the disc that is to receive the file and the selection of a segment of the buffer which is to be utilized in the transfer of the file to the disc sectors. Generally, the buffer segment is organized as a circular register which can contain a selected number of sectors, and sector length blocks within the buffer segment are reused once data stored in a block has been transferred from the buffer. Once these operations are complete, the system microprocessor transmits transfer control parameters to the host interface controller and issues a command to the host interface controller to transfer one or more sectors of data to the buffer segment. The state machine of the host interface controller then coacts with the host and a buffer controller, which provides microscopic control over the buffer, to cause the characters which comprise the file to be transferred into the sector blocks within the buffer segment.

Once the read/write head reaches the track that contains the sectors that are to receive the file, the microprocessor similarly issues commands and control parameters to a disc interface controller to cause sectors of data that have been stored in the buffer segment to be transferred, a bit at a time, to the appropriate sectors on the disc. More particularly, the disc interface controller, like the host interface controller, receives commands calling for the transfer of a selected number of sectors from the buffer segment to a read/write circuit which carries out the magnetization of cells along the data tracks.

Reading of a file is carried out in a similar manner. As in the case of writing, the system microprocessor will select a buffer segment to temporarily store data as it is read from a disc and will issue commands to the disc drive servo system to bring the read/write head into radial alignment with the track that contains the sectors at which the file is stored. Once these preliminary steps have been completed, the system microprocessor issues commands and control parameters to the disc interface controller to transfer one or more sectors from the disc to the buffer segment and subsequently issues commands to the host interface controller to transfer these sectors of data from the buffer segment to the host.

As will be clear from the above description of reading and writing, the system microprocessor must maintain a record of the number of sectors that have been transferred into and out of the buffer segment. For example, should the buffer segment become filled to capacity, further transfer of data into the buffer segment would result in overwriting of blocks of data that have not yet been transferred from the buffer segment. Similarly, issuance of a command to transfer data from the buffer segment after all blocks that have been transferred to the buffer segment have already been transferred from the buffer segment would result in the transfer of previously transferred data. In the first case, portions of a file would be deleted, and in the latter case unwanted insertions would be included in the file.

The maintenance of a record of sector transfers is accomplished by the issuance of commands to the controllers to transfer a selected number of sectors of data and by the use of interrupts of the system microprocessor when such number of sectors have been transferred. Thus, the host and disc interfaces generally comprise counting circuits which count the number of data transfers that have been made to or from the buffer segment and an interrupt generator that generates an interrupt to the system microprocessor when the selected number of sectors have been transferred. More particularly, the state machines in the interface controllers receive signals from the counting circuits each time a sector is transferred and are "programmed" by the selection of the truth table of decoders they contain to provide status signals to an interrupt generator indicative of the number of sectors that have been transferred. The interrupt generators then issue the interrupts to the system microprocessor.

While this general scheme of effecting data transfers between the host and discs of a disc drive provides an effective means of implementing the storage and retrieval of data files, problems have arisen with the use of the system microprocessor to orchestrate the transfers of sectors of data into and out of the buffer segment. Initially, as is known in the art, microprocessors operate very slowly in comparison with the rate at which data transfers are made at the character, or microscopic, level. In the time required for the system microprocessor to execute one program instruction, many characters of data are transferred into and out of the buffer segment. Such high speed transfer at the character level is necessary in order to effect the storage or retrieval of a file in a time that is acceptable to the users of computers and is the reason for the use of hardware controllers to control the transfer of data at the character level. Unlike a microprocessor, programming of a state machine is implemented in a decoder, rather than in a memory device, so that the state machine can be caused to have a limited number of functions which are performed in only a few clock cycles. Thus, the state machine operates at a rate that is comparable to the time required to magnetize a cell along a data track and can be used to control microscopic level data transfers.

Because of the relatively slow operation of the microprocessor, a decision must be made by the microprocessor at a time that is considerably in advance of the time that a sector on a disc that is to receive data from the buffer segment or that is to provide a source of data to be transferred to the buffer segment reaches the read/write head by means of which data is magnetically read from or written to the track. Typically, unless the microprocessor has received signals indicative of the presence of a sector of data in the buffer to be written to a disc or the presence of a free block to receive a sector in the buffer segment by the time the previous sector along the track has reached the read/write head, it will not have time to issue the necessary commands to the disc interface controller to transfer data to or from the disc. Commonly, the disc interface controller contains circuitry for reading sector headers and comparing them with header identification codes supplied by the system microprocessor and reporting to the disc interface controller state machine when the previous sector header has been read. The state machine is programmed to respond to such report by providing a status code to the interrupt generator that results in an interrupt of the system microprocessor which then reads the status code and determines, while such previous sector is passing the read/write head, whether a sector of data is available to be written to the disc or whether a sector length block is available in the buffer to receive data from disc. If not, no command to transfer a sector of data will be issued to the disc interface controller. Thus, even though a sector to be written to a disc may be in the buffer segment or space to receive data from the disc may be available in the buffer at the time that the sector actually reaches the read/write head, writing or reading, as the case may be, will, perforce, be suspended for the time required for the disc to make a complete revolution to return the sector next to receive or provide data to the read/write head. Such a suspension will unduly lengthen the time required to store a file to a disc or retrieve a file from a disc.

An additional problem with microprocessor intervention each time one or only few sectors are transferred into or out of the buffer segment is the amount of microprocessor operating time that must be allocated to the transfer of data between the disc and the host. As can be seen from the above, each time either interface controller reports the completion of the transfer of a sector, or a few sectors, of data to or from the buffer segment, the system microprocessor must execute an interrupt routine that will determine whether additional sectors can be transferred into or out of the buffer sector and cause the microprocessor to issue commands to transfer additional sectors. Since the system microprocessor provides overall control of the disc drive, the time required for executing these interrupt routines can limit the capabilities of the disc drive solely on the basis that the microprocessor processing time is not available to carry out functions required to provide additional capabilities. Thus, while the general scheme for effecting data transfers between a host and a disc is, in principle, an effective approach to data storage and retrieval, the implementation of the scheme has given rise to practical problems that have not heretofore been solved.

SUMMARY OF THE INVENTION

The present invention overcomes these practical problems by including in a disc drive a hardware buffer manager that effects sector level control of data transfers. To this end, the interface controllers are comprised of state machines that are programmed, by appropriate truth table selection, to suspend sector level data transfers in response to pause signals received from the buffer manager so that intervention by the microprocessor is required only at the initiation of transfer of data between a host computer and a disc and the conclusion of the transfer. More particularly, the system microprocessor commands transfers substantially on a file basis in which the state machines are commanded to transfer the number of sectors in a file to be written or read, and the buffer manager counts sectors as they are transferred between the host and the buffer and the buffer and a disc and issues pauses to the state machines to suspend sector transfers when the buffer segment utilized in a transfer is filled to capacity or depleted of sectors of data remaining to be transferred from the buffer.

Thus, in the present invention, counter circuitry in the interface controllers that is normally used to count data transfers at the microscopic level to provide signals to the state machines to initiate interrupts is instead utilized to provide sector counts to sector transfer counter circuits in the buffer manager so that the buffer manager can maintain a running count of the number of sectors that have been transferred to the buffer and a running count of the number of sectors that have been transferred from the buffer. Specifically, the buffer manager comprises: a host sector transfer counter circuit that is incremented each time a sector count is received from the host interface controller; a disc sector counter circuit that is incremented each time a sector count is received from the disc interface controller; and a pause generator that compares the number of sectors that have been transferred between the host and buffer segment to the number that have been transferred between the disc and the buffer segment and generates a pause signal, using a combinatorial logic circuit, that is transmitted to the appropriate interface controller at such times that the buffer segment is filled to capacity or has been depleted of data that has not yet been transferred from the buffer segment.

Since the decision to transfer another data sector to or from a disc is made in combinatorial logic, such decision can be delayed to the end of the transfer of a previous sector; more specifically, the disc interface controller is programmed to make the transfer unless a pause signal has been received and the counting of the transfer of previous sectors forms a part of the basis for the generation of the pause signal. Hence, if the completion of the previous transfer leaves a data sector available for transfer to a disc, the transfer will be made. Similarly, if the completion of transfer of a sector to the buffer segment from the disc leaves space within the buffer segment to receive the next sector, the next sector will be transferred to the buffer segment. Moreover, such operation is effected without intervention by the system microprocessor to eliminate microprocessor bandwidth problems that have occurred with prior art disc drives.

An important object of the present invention is to limit the time for transferring computer files between a host computer and discs of a disc drive.

Another object of the invention is to limit the demands made on system microprocessors of disc drives in the operation of the disc drives.

A further object of the invention is to effect a saving in microprocessor bandwidth while increasing the speed with which computer files can be written to and read from a disc drive.

Other objects, features, and advantages of the present invention will become apparent from the following detailed description when read in conjunction with the drawings and appended claims.

BRIEF DESCRIPTION OF THE DRAWINGS

FIG. 2 is a block diagram illustrating relevant portions of the buffer controller of the disc drive of FIG. 1.

FIG. 3 is a schematic diagram of the host address circuit of the buffer controller.

FIG. 9 is a block diagram of a second preferred embodiment of the host reset circuit of the buffer manager shown in FIG. 6.

DESCRIPTION OF THE PREFERRED EMBODIMENT

Figure 1:
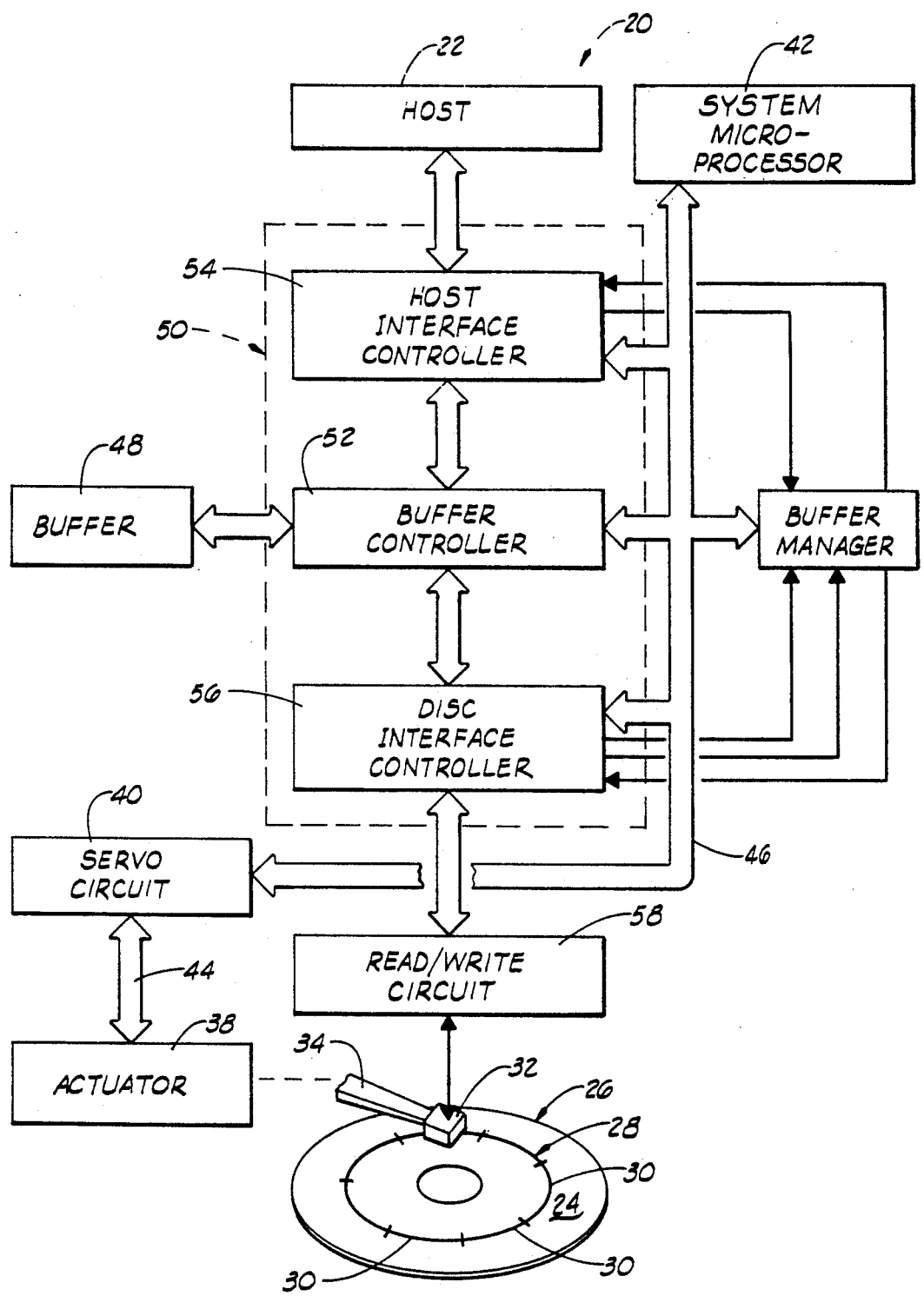
FIG. 1 is a functional block diagram of a disc drive constructed in accordance with the present invention.

Referring now to the drawings in general and to FIG. 1 in particular, shown therein and designated by the general reference numeral 20, is a disc drive that can be mated with a host 22 for storing files used by the host 22. As is known in the art, such files are stored on magnetizable surfaces, such as the surface 24 in FIG. 1, of one or more rotating discs, such as the disc 26, along concentric data tracks, such as the data track 28. In general, a file is divided into a plurality of data sectors for storage and the data sectors correspond to sectors 30 defined along the data tracks 28. To this end, the discs are mounted on a spindle 34 which is conventionally rotated at a precisely controlled rate that provides a correspondence between data sectors into which a file is divided and the sectors defined on the discs 26. Identification of the sectors is conventionally effected by formatting the sectors to include identifying headers that precede data fields to which data contained within data sectors into which files are divided are written.

The data and the headers are written in the form of reversals in the magnetization of successive cells along the data tracks 28 by read/write heads, one of which has been illustrated and designated by the reference numeral 32, that fly in close proximity to the data surfaces 24, and the data is subsequently read from a disc by detecting emf pulses induced in the heads 32 as cell boundaries pass by the read/write heads. In order to write to or read from a sector on a particular track, the heads 32 are supported, via arms 34, by an electromechanical actuator 38 that is operated to move the heads 32 radially to a selected track and, once the selected track has been reached, maintain the head in radial alignment with the track. Such movement of the heads and the subsequent track following is carried out in response to control signals received on a bus 44 from a servo circuit 40 in a conventional manner that need not be described for purposes of the present disclosure. It will suffice to note that the disc drive 20 is comprised of a system microprocessor 42 that provides overall control of the operation of the disc drive 20, and track seeking is effected in response to control, data, and address signals received from the microprocessor 42 on a disc drive system bus 46. Thus, any track on the discs can be conventionally accessed by commands issued by the system microprocessor 42 to the servo circuit 40.

To carry out the writing or reading of data to or from the discs 26, the disc drive is further comprised of a data transfer circuit (not generally designated in the drawings) that includes a buffer 48, commonly a DRAM, that temporarily stores data during transfers between the host and a disc in a selected buffer segment, defined as will be described below, that will hold an integral number of sectors of data. More specifically, data sectors are transferred byte-by-byte into the buffer segment from the host or a disc and subsequently transferred to a disc or the host, respectively. Control of the byte-by-byte transfer is implemented by a transfer coordination circuit 50, which for purposes of the present disclosure can be considered to be comprised of: a buffer controller 52 which controls the buffer 48 for writing and reading data to and from the buffer; a host interface controller 54 which coacts with the host 22 and buffer controller 52 to coordinate byte-by-byte transfers between the host and the buffer; and a disc interface controller 56 which coacts with the buffer controller 52 and a read/write circuit 58 to coordinate transfers between the buffer 48 and the read/write circuit 58. As will be discussed more fully below, the disc interface controller 56 includes conventional circuitry for serializing bytes of data into individual bits as the data is transferred to the read/write circuit 58 so that the data can be serially written, after conventional encoding, to a selected sector along a selected data track. Similarly, data bits received from a disc are collected into bytes for transfer into the buffer during reading of a file from a disc. With exceptions to be noted below, the above described components of the disc drive 10 are conventional and operate in a conventional manner in the writing or reading of data to or from a disc.

In addition to the transfer coordination circuit 50, the data transfer circuit (not numerically designated in the drawings) of the present invention is further comprised of a buffer manager 60 that, in the present invention, is utilized to provide control of data transfers at the sector level, as will be described below with respect to FIGS. 6 through 10. To provide a basis for discussion of the construction and operation of the buffer manager 60, it will be useful to first consider the construction and operation of the buffer controller 52, the host interface controller 54 and the disc interface controller 56, portions of which that are pertinent to the present invention have been presented in block diagram form in FIGS. 2 through 5.

Referring first to FIG. 2, the buffer controller 52 is comprised of a multiplexer 62 that is electrically connected to the address inputs of the buffer 48 to permit data storage registers in the buffer to be accessed from three sources: a host address circuit 64; a disc address circuit 66; and, as will be discussed below, the microprocessor 42. Additionally, the buffer controller 52 is comprised of a conventional buffer controller logic circuit 68 which controls the input and output to and from the buffer 48. To this end, the buffer controller logic circuit 68 selects the source of the of data to be written to or read from the buffer 48, via a selection bus 70 to the multiplexer 62, transfers the data via a bus 72 to or from the buffer 48, and provides appropriate control signals to the buffer 48 on a control bus 74. During operation of the disc drive to store or retrieve files, the buffer controller logic circuit, which contains conventional arbitration circuitry for selection of the source and destination of data transferred to and from the buffer 48, receives and transmits data from and to the host interface controller 54 on a bus 76 and receives and transmits coordination signals from and to the host interface controller 54 on a coordination bus 78 to effect byte-by-byte transfer of data between the host interface controller 54 and the buffer 48. Similarly, the buffer controller logic circuit 68 transmits data, at a byte-by-byte level, between the buffer 48 and the disc interface controller 56 via the bus 72 and a bus 80 as a result of coordination signals transmitted between the buffer controller logic circuit 68 and the disc interface controller 56 via a bus 82. Additionally, the buffer controller logic circuit communicates with the system microprocessor 42 via a microprocessor interface 84 to permit the microprocessor 42 to address any location in the buffer 48 and write a byte to such location. Such addressing is implemented by conventional circuitry in the buffer controller logic circuit 68 and the address of the data location to which the microprocessor writes is supplied to the multiplexer 62 via a bus 86 from the buffer control logic circuit 68. Additionally, at such times that a byte of data is transferred between the host interface controller 54 and the buffer 48, the host address circuit, which contains the address of the next memory location in the buffer 48 to be utilized in a host-buffer byte transfer, receives an increment signal on a signal path 88 from the buffer controller logic circuit 68. A similar increment signal is provided to the disc address circuit 66, via signal path 90, to similarly keep track of memory location addresses involved in disc-buffer byte transfers.

The construction of the buffer controller logic circuit 68 is conventional and the circuit 68 operates in a conventional manner so that a detailed discussion of such structure and operation need not be presented for purposes of the present invention. Indeed, the present invention contemplates that any conventional buffer control circuit may be utilized in the disc drive 20 and operated in the manner for which such circuit has been designed in the practice of the present invention. More particularly, the relevance of the construction and operation of the buffer controller 52 to the present invention is limited to features of the host address circuit 64 that have been shown in FIG. 3, identical features found in the disc address circuit 66 and to the capability of the system microprocessor 42, or a conventional hardware circuit (not shown but noted below), to write data bytes directly to selected memory locations in the buffer 48.

Referring to FIG. 3, the host address circuit 64 is comprised of a host address counter 92 which, during operation of the disc drive 20 to store or retrieve data, contains the buffer address to which the next byte of data received from the host interface controller is to be written or the source of the next byte of data to be transferred from the buffer 48 to the host interface controller 54. The counter 92 is of the type that can be loaded from a register connected to data inputs of the counter 92 by a signal received, via a signal path 94, at a load input of the counter, and in the practice of the present invention, the host address circuit 64 is comprised of a buffer base register 96 that supplies a buffer segment base address, loaded into the register 96 via the microprocessor interface 84, from the microprocessor 42 to the data inputs of the host address counter 92. Thus, each time the counter 92 receives a signal on the signal path 94, the contents of the buffer base register 96 will be loaded into the counter 92. Such loading can be effected directly from the system microprocessor 42 via a signal path 96 from the microprocessor interface 84 and an OR gate 98 and a demultiplexer 100 that receives increment signals on the signal path 88 from the buffer controller logic circuit 68 and transmits such signals either to the OR gate 98 or, via a signal path 102, to the clock input of the counter 92.

The output signal path from the demultiplexer is determined by a signal received from a comparator that compares the address in the counter 92, received on bus 106, to a buffer segment limit address that is loaded into a buffer limit register 108 from the microprocessor 42 prior to initiation of data transfers between the host and disc. The buffer segment limit address is presented to the comparator 104, via a bus 110, and the comparator provides a signal to the demultiplexer 100 that will cause the increment signal received from the buffer controller logic circuit 68 on signal path 88 to be transmitted via the OR gate 98 to the load input of the host address counter 92 at such times that the address in the counter 92 is equal to the buffer segment limit address. At other times, such increment signal is transmitted to the counter 92 clock input to increment the address therein. The counter 92 then provides the address in the buffer 48 to or from which a byte is to be transferred, when the transfer is made between the host interface controller and the buffer 48, to the multiplexer 62 via a bus 112 that has been indicated in FIGS. 2 and 3. The disc address circuit 66 is identical in construction to the host address circuit 64 so that it need not be described in detail for purposes of the present disclosure.

The above described construction of the host and disc address circuits 64 and 66, respectively, are utilized to define a buffer segment having a circular register character. As will be clear from such construction, the buffer segment base address can be loaded into the buffer base register 96 and thence into the host address counter 92 from the microprocessor 42 prior to initiation of data transfers and the buffer segment limit address is similarly loaded into the buffer limit register. Thereafter, each time a byte of data is transferred between the host interface controller and the buffer, the buffer address that receives or provides the byte is incremented until the buffer limit address is reached. When the counter 92 is incremented to such address following a data transfer between the host interface controller and the previous address in the buffer, the demultiplexer 100 will provide a connection between the signal path 88 and the OR gate 98 so that the next increment signal received by the host address circuit 64 will reload the buffer segment base address into the host address counter 92. The reload signal from the demultiplexer 100 can also be utilized in the operation of the buffer manager 60 in a manner to be described below and, in such case, is provided to the buffer manager 60 on a signal path that has been indicated in dashed line at 114 in FIGS. 2 and 3. The buffer segment for disc to buffer data transfers, which will at times differ from the buffer segment for host to buffer transfers, is similarly defined in the disc address circuit 66, and the signal, corresponding to the signal on signal path 114, that reloads the buffer segment base address into the disc address circuit can be provided to the buffer manager via signal path 116 indicated in dashed line in FIG. 2.

Figure 4:
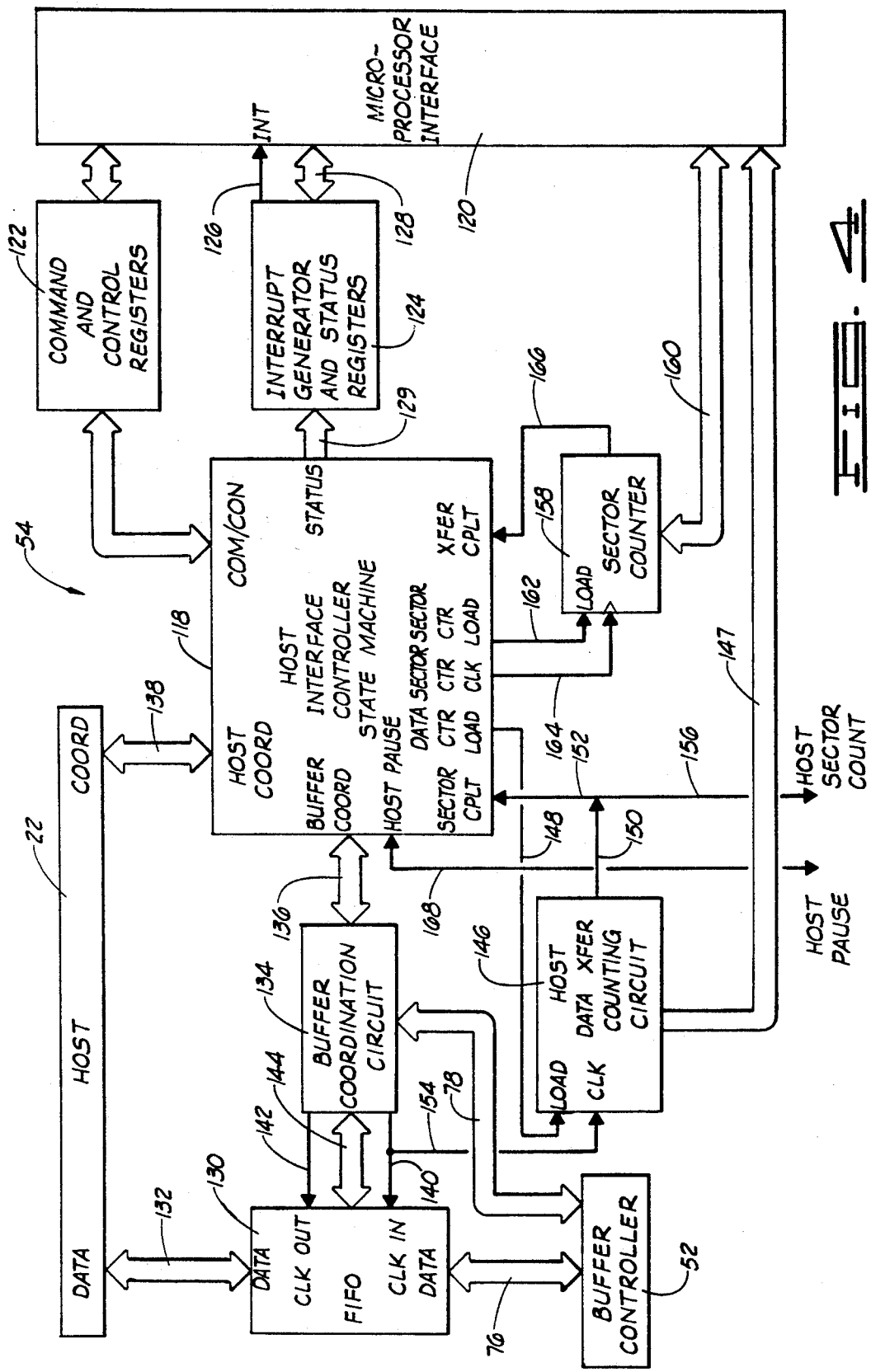
FIG. 4 is a functional block diagram of relevant portions of the host interface controller of the disc drive shown in FIG. 1.

The present invention contemplates that the host interface controller 54, illustrated in FIG. 4, can be an adaptation of any conventional host interface controller with which disc drives are conventionally provided. The host interface controller 54 is comprised of a host interface controller state machine 118, which is programmable by the selection of a truth table for a decoder (not shown) to rapidly perform a limited number of specific, selected functions. As is known in the art, these functions and the decoder which implements their selection vary from one disc drive to another, in part to meet protocols for interfacing the disc drive with a host and in part to embody an operating scheme for the host interface controller 54 that is selected by the manufacturer of the disc drive. Since these operating schemes will vary from one manufacturer to another and from one mode disc drive to another, no purpose would be served in describing the detailed structure or presenting the truth table for the decoder of the state machine in any particular disc drive. A more useful approach, which is consistent with the object of the present invention to provide a disc drive that eliminates problems associated with microprocessor intervention in the transfer of data between a host and discs of the disc drive, will be to describe the functions of the host interface controller state machine 118 as such functions relate to the present invention to provide a guide for programming the decoder of the host interface controller state machine 118.

As is conventional, the host interface controller state machine 118 receives commands and control parameters that determine its operation from the system microprocessor 42 via a microprocessor interface 120. Such commands and control parameters are stored in command and control registers, collectively indicated at 122, that input to the state machine decoder to determine the states through which the state machine will pass during operation of the disc drive 10 and the functions that the host interface controller 54 will carry out as the state machine passes through these states. Similarly, and as is also conventional, the state machine 118 communicates with the microprocessor 42 via an interrupt generator and status registers, collectively indicated at 124, which provide an interrupt to the microprocessor interface 120 on a signal path 126 and codes indicative of the status of the state machine 118 on a bus 128. Such codes are provided from the state machine to the interrupt generator and status register via a bus 129 from the state machine to the interrupt generator and status registers. Thus, by suitable programming, the microprocessor 42 can command the host interface controller 54 to carry out selected operations, using selected control parameters, and report the completion of the execution of these operations. As has been indicated above, in the prior art these commands include a command to transfer one or more sectors of data from the host 22 to the buffer 48 and to report the completion of the execution of the transfer, via a microprocessor interrupt, so that the system microprocessor 42 can maintain a record of the status of the buffer 48. In the present invention, interrupts indicative of partial transfer of a file for which a storage or retrieval request has been made by the host 22 are discontinued in the operation of the disc drive 20 to write or read the file to a disc. Rather, and as will be described below, the present invention contemplates that the microprocessor 42 will command the host interface controller to transfer all sectors of the file and report the execution of the transfer only when the complete file has been transferred.

As in the prior art, the host interface controller state machine 118 also coordinates byte-by-byte transfers of data from the host 22 to the buffer 48, and such coordination is carried out in a conventional manner, which will now be briefly summarized to provide a basis for discussing the operation of the disc drive 20 of the present invention. As is conventional in the art, the host interface controller 54 is comprised of a bidirectional FIFO 130 which receives or transmits bytes of data from or to the host 22 on a bus 132 and transfers the data bytes to or from the bus 76 leading to the buffer controller 52 on a first in, first out basis. As is also conventional, such transfers are coordinated by a buffer coordination circuit 134 which both receives and transmits coordination signals from and to the buffer controller 52 and the state machine 118. The latter signals, carried by a bus 136 between the state machine 118 and the buffer coordination circuit 134, are derived from and give rise to coordination signals that are transmitted back and forth between the host 22 and the host interface state machine 118 on a bus 138 in accordance with a protocol that is selected for the host to disc drive interface. During byte-by-byte transfers through the FIFO 130, data bytes are clocked into the FIFO 130 via clock signals received on a signal path 140. Data is presented to the host 22 during reading of files, or to the buffer controller 52 during writing of files, by clock signals received by the FIFO 130 on a signal path 142. Control and status signals are transmitted between the FIFO 130 and the buffer coordination circuit 134 on a bus 144. Control signals include signals which determine the direction of data transfer through the FIFO 130. FIFO status signals include signals indicating whether the FIFO 130 has been filled to capacity or emptied of data bytes previously received.

As is conventional in the art, the byte transfers are counted by a host transfer counting circuit 146 including a down counter (not shown) and a latch (not shown), which can be loaded with any selected binary count specified, via a bus 147, by the microprocessor 42 and are transmitted to the microprocessor interface 120. (The bus 147 is bidirectional, and the circuit 146 is further comprised of circuitry, not relevant to the present invention, for enabling the microprocessor 42 to read the contents of the circuit 146. In general, the present invention contemplates that such feature will be an option included in all of the counters used in the disc drive 20 for diagnostic and testing purposes and will be used for selected purposes in the present invention. Where the feature is used, it will be discussed.) In response to a load signal, received from the host interface controller state machine 118 on a signal path 148, and subsequent clock signals received at a clock input of the host transfer counting circuit 146, the circuit 146 executes a countdown from the selected binary number and provides a pulse to the host interface controller state machine 118, via a signal path indicated at 150 and 152 in FIG. 4. The clock signals received from the signal path 140, via a signal path 154, are used to clock data bytes into the FIFO 130 so that the host transfer counting circuit 146 provides a means for counting the transfer of any selected number of data bytes between the host 22 and the buffer 48. In the present invention, such number is selected to be one sector of data for reasons that will become clear below. Moreover, in the practice of the invention, each countdown of the transfer of a sector of data through the FIFO 130 provides a host sector count that is transmitted to the buffer manager 60 on a signal path 156 to enable the buffer manager to maintain a count of sector transfers between the host 22 and the buffer 48 for a purpose also to be described below.

In addition to the counting circuit 146, the host interface controller 54 of the present invention is further comprised of a sector counter 158, constructed in the same manner as the host transfer counting circuit 146, that can be loaded with a selected binary number received from the microprocessor 42 via the interface 120 and a bus 160 to provide a countdown of the selected number in response to a load signal and subsequent clock signals received from the state machine 118 on signal paths 162 and 164, respectively. In the present invention, the number counted by the sector counter 158 is the number of sectors of data to be transferred between the host 22 and a disc 26 in the storage or retrieval of a file, and the host interface controller state machine is programmed to clock the sector counter 158 each time a pulse, indicating transfer of one sector of data, is received from the host transfer counting circuit 146. At the conclusion of a countdown by the sector counter 158, the counter 158 provides a pulse to the host interface controller state machine 118 on a signal path 166, and the state machine 118 is programmed to execute any termination steps that may be required by the host interface protocol and to subsequently interrupt the system microprocessor 42.

As is conventional, the coordination of the data transfers between the host 22 and the buffer 48 must at times be suspended; for example, when the FIFO 130 is filled to capacity or is empty. Such suspensions are effected by appropriate programming of the host interface controller state machine 118. In the present invention, the state machine 118 is further programmed to suspend data transfers between the host 22 and the buffer 48 upon reception of a host pause signal on signal path 168 from the buffer manager 60 for a purpose to be described below. Finally, the present invention contemplates that the contents of the sector counter 158 will, in particular circumstances, be read by the system microprocessor 42, also for a purpose to be discussed below.

Figure 5:
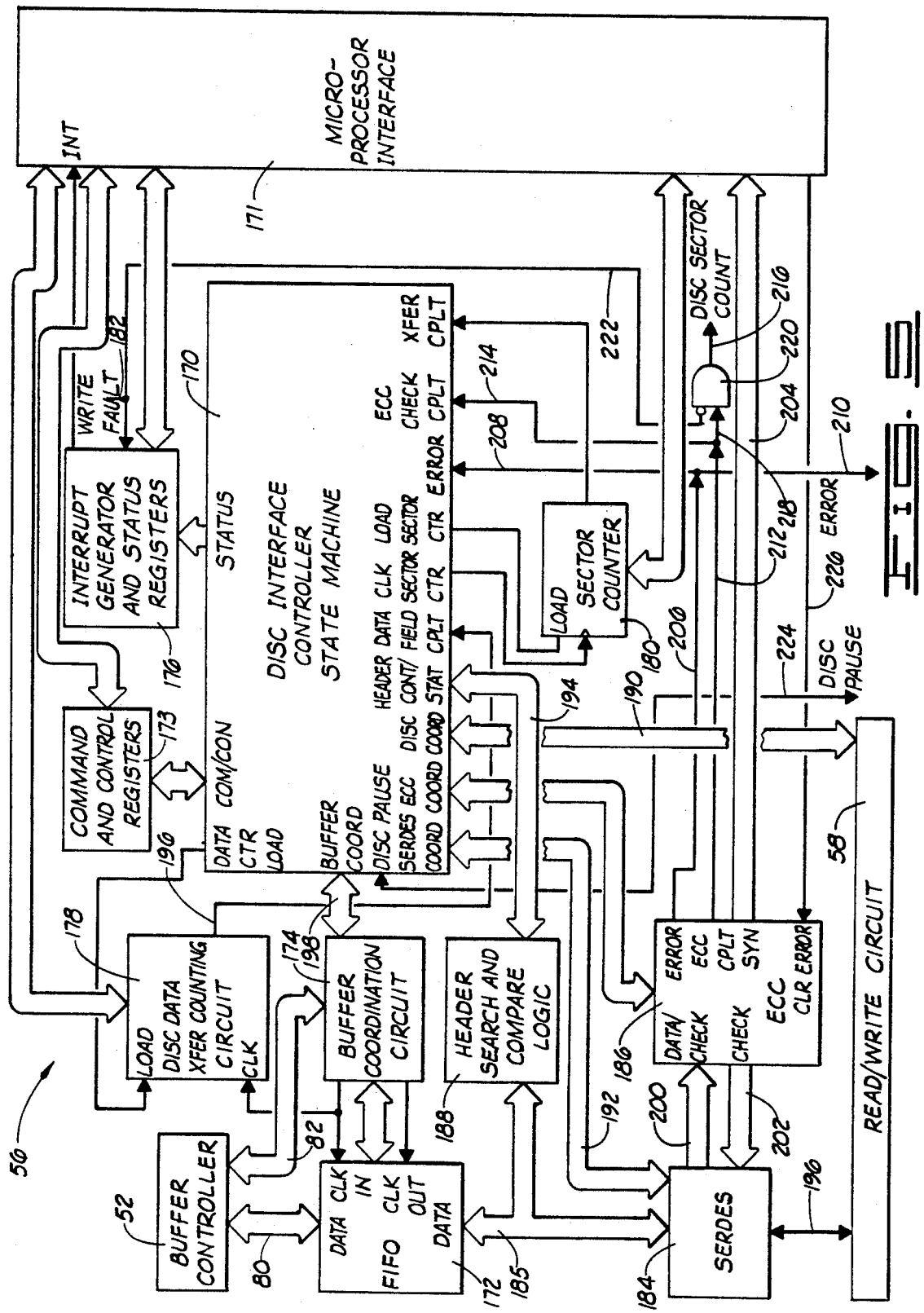
FIG. 5 is a functional block diagram of relevant portions of the disc interface controller of the disc drive shown in FIG. 1.

Referring now to FIG. 5, shown therein is a functional representation of the disc interface controller 56. The disc interface controller 56 is comprised of a disc interface controller state machine 170, which receives commands and control signals from the system microprocessor 42 via an interface 171 and is programmed to coordinate transfers at the microscopic level between the buffer 48 and the read/write circuit 58 in a manner that is similar to the programming of the host interface controller state machine 118 for coordination of transfers between the host 22 and the buffer 48. To this end, the disc interface controller 56 is further comprised of many of the same components that are found in the host interface controller 54 and in the prior art.

In particular, the disc interface controller is comprised of the combination of a FIFO 172 and a buffer coordination circuit 174 that are used in the coordination of byte transfers between the buffer controller 52 and the read/write circuit 58 in a manner similar to coordination of byte transfers between the host 22 and buffer 48. The disc interface controller is comprised of command and control registers, collectively indicated at 173, and an interrupt generator and status registers, collectively indicated at 176, that with one exception, perform the same functions as their counterparts in the host interface controller 54. The exception is that provision is made in the disc interface controller to interrupt the writing of data to a disc should some condition occur that would require termination of writing of data to a disc. An example of such a condition is that the read/write head 32 has become misaligned with the track to which data is to be written so that a danger exists that data on adjacent tracks will be overwritten and lost. To prevent this loss, servo circuits of disc drives are commonly constructed to generate a signal indicative of the displacement of the head 32 beyond a selected distance from the center of the track. When this or other conditions, called write faults, arise, a signal is transmitted to the read/write circuit 58 to immediately terminate writing of data, and such signal is further transmitted to the interrupt generator of the disc interface controller to give rise to an interrupt that will apprise the system microprocessor that the write fault has occurred. Such signal has been indicated in FIG. 5 as being received by the interrupt generator and status registers 176 on a signal path 182.

The disc interface controller 56 is comprised of a disc data transfer counting circuit 178 and a sector counter 180 that are constructed in the same manner and carry out the same functions as their counterparts in the host interface controller 54.

The disc interface controller 56 differs from the host interface controller 54 in that the disc interface controller is further comprised of the following components. A serializer/deserializer 184 is interposed between the FIFO 172 and the read/write circuit 58 to convert bytes received from the FIFO on a data bus 185 to be written to a disc to a serial stream of bits and collect bits from the disc into bytes. An ECC circuit 186 generates check bytes to be appended to a sector of data during writing and generates syndromes indicative of read errors during reading of data. A header search and compare logic 188 is used to determine when a sector to which data is to be written or from which data is to be read has reached the read/write head 32. All of this circuitry is conventional so that it need not be described in detail for purposes of the present disclosure. Rather, it will suffice to briefly note the operation of such circuitry to provide a basis for understanding the present invention.

When data is to be transferred between the host 22 and a sector on a disc, the sector must be located before the transfer can take place. To this end, the sectors on the disc are commonly provided with headers which identify the sectors. Prior to reading or writing data, the state machine 170 provides and receives signals from the read/write circuit 58, the serializer/deserializer 184, and the header search and compare logic 188 on buses 190, 192, and 194 that orchestrate location of the sector to which data is to be written or from which data is to be read. Generally, the sector headers are read by the read/write head 32 as the disc 26 rotates beneath the head 32 and emf pulses induced by passage of cell boundaries by the head 32 are transmitted from the read/write circuit 58 to the serializer/deserializer 184 via a signal path 196 and, after collection into bytes, to the header search and compare logic 188 via the bus 185. The header search and compare logic 188, which has previously received a code identifying the sector to which data is to be written or from which data is to be read, compares header identification information carried by the signals received from the serializer/deserializer 184. When the sector reaches the read/write head 32, the header search and compare logic provides signals to the disc interface controller state machine 170 indicating that reading or writing may now take place. The state machine 170 will then orchestrate data transfers between the buffer 48 and the read/write circuit 58 via appropriate coordination signals on the bus 82, from the buffer controller 52 and the buses 190 and 192, and additional coordination signals on a bus 198 to the buffer coordination circuit 174, which controls the operation of the FIFO 172 in the same manner that control of the FIFO 130 is effected to coordinate host-buffer transfers in the host interface controller 54. Such operation includes the clocking of bytes into the FIFO 172, and input clock signals transmitted to the FIFO 172 are counted by the disc data transfer counting circuit 178 in the same manner that signals which are used to input data into the FIFO 130 of the host interface controller are counted. Thus, the counting circuit provides a data field complete signal on signal path 196 to the disc interface controller state machine 170 each time a sector of data is transferred into the FIFO 172.

During the transfers between the buffer 48 and the read/write circuit 58, data issuing from the FIFO 172 is transmitted to the ECC circuit 186 via a bus 200 so that, during writing of data to a disc, error check bytes can be generated by the ECC circuit 186 and appended to the data via a bus 202. During reading, the data and check bytes recovered from the disc are transferred to the ECC circuit 186, which generates syndromes indicative of any errors that may have occurred in the transcription of the data and presents them to the system microprocessor 42 via a bus 204 to the interface 171. The ECC circuit further provides an error signal to the disc interface state machine 170 via a signal path indicated at 206 and 208 if the error checking syndromes indicate that a data error has occurred, and in the present invention, such signal is transmitted to the buffer manager on a signal path 210 for a reason to be discussed below The operation of the ECC circuit 186 terminates during a data transfer with generation of an ECC check complete signal, transmitted to the disc interface controller state machine 170 on a signal path indicated at 212 and 214, which indicates during writing of data that the check bytes have been appended to a sector of data written to a disc and indicates during reading of data that the syndromes have been determined and stored. In the present invention, the ECC check complete signal, which is generated each time a sector of data is transferred between the buffer 48 and a disc 26, is transmitted to the buffer manager 60 as a sector count signal that appears on a signal path 216 via a signal path 218 and an AND gate 220. For reasons that will become apparent below, the appearance of the error signal on the signal path 210 must precede the appearance of the sector count signal on the signal path 216. If necessary, a delay circuit (not shown) can be placed in the signal path 216 to assure such order of appearance of the error and sector count signals. The AND gate 220 also receives signals indicative of write faults via a signal path 222 at an inverting input so that, should a write fault occur, transmission of sector counts to the buffer manager 60 will be terminated.

As noted above, the coordination of data transfers between the host and buffer must at times be suspended, and it is conventional to effect such suspensions by appropriate programming of the host interface controller state machine 118. Similarly, suspension of transfers to the read/write circuit 58 must, at times, occur in the conventional operation of the disc interface controller, and the disc interface controller state machine 170 is conventionally programmed to effect suspensions. In the present invention, the state machine 170 is further programmed to suspend data transfers between the read/write circuit 58 and the buffer 48 upon reception of a disc pause signal on signal path 224 from the buffer manager 60 for a purpose to be described below.

One further feature of the disc interface controller 56 should be considered at this time. As noted, the ECC circuit 186 generates syndromes as data is read from a disc and provides these syndromes to the system microprocessor 42 via the interface 171 while providing an error signal to the disc interface controller state machine 170 when a read error occurs. As is conventional, the disc interface controller state machine 170 is programmed to respond to an error signal to interrupt the system microprocessor should a read error occur. As is common practice, the system microprocessor is programmed to read the syndromes in response to the interrupt and determine both the data bytes that are in error and the error that has been made. In the prior art, it has been common practice to suspend data reading operations when an error is detected sector while the error is corrected in the buffer 48. It is for this reason that specific memory locations in the buffer 48 can be addressed directly from the microprocessor 42 which can then rewrite the data in such locations. Once the errors have been corrected, registers that contain the syndromes in the ECC circuit 186 are then cleared via a clear error signal transmitted to the ECC circuit on a signal path 226, and reading is resumed The present invention contemplates that such treatment of read errors can be continued in the practice of the invention, and in such case, the sector in the buffer that is in error can be determined by reading the sector counters 158 and 180 of the host and disc interface controllers 54 and 56, respectively. However, the present invention also contemplates a second mode of operation in the correction of errors. Since errors rarely occur in the reading of data, the present invention contemplates that the syndrome registers in the ECC circuit will be cleared in the conventional manner once the syndromes have been read by the system microprocessor, but the system microprocessor 42 will be programmed to suspend the reading of a file only in the rare eventuality another sector read from the disc 26 contains an error which is detected before the first sector has been corrected in the buffer 48.

As will be clear from the commonality of components of the host interface controller 54 and the disc interface controller 56 with conventional interface controllers and the commonality of control functions carried out by all such interface controllers, the host and disc interface controllers 54 and 56 operate in a manner that is very similar to the operation of interface controllers found in conventional disc drives. Accordingly, it will be useful to summarize the operation of the host and disc interface controllers 54 and 56 and contrast such operation with the prior art before proceeding to a discussion of the buffer manager 60 and the operation of a disc drive which includes the buffer manager 60.

Conventionally, writing of a file to a disc drive is initiated by the transmission of appropriate signals, conforming to a protocol adopted throughout the industry, from the host 22 to the host interface controller 54 via the bus 138 shown in FIG. 4. Such signals are received by the host interface controller state machine 118, which is programmed to receive these signals and interrupt the system microprocessor 42 via the interrupt generator and control registers 124. Following the interrupt, communications between the host 22 and the system microprocessor 42 via the state machine 118 provide the system microprocessor 42 with the number of sectors that are to be written and the locations on discs of the disc drive 20 that are to receive these sectors. Once such information has been received by the system microprocessor 42, the system microprocessor will send commands to the servo circuit 40 to move the read/write heads 32 to the tracks on the discs that contain these sectors and select a buffer segment in accordance with criteria written into the microprocessor programming. The buffer segment base and limit addresses, which define the buffer segment, are then written to the buffer base and limit registers, 96 and 108, respectively (FIG. 3), of the host address circuit 64 and the corresponding registers of the disc address circuit 66. To this point, the operation of the disc drive 20 to write a file differs not at all from prior art disc drives.

Once the buffer controller 52 has been initialized, the system microprocessor outputs the number of sectors to be written to the sector counters 158 and 180 and commands the host interface controller state machine 118 to transfer data to the buffer 48 so long as the sector counter has not counted the total number of sectors to be transferred. In this respect, the operation of the disc drive 20 differs from the operation of prior art disc drives. While it is known to command transfer of several sectors to the buffer in prior art disc drives, it is generally not contemplated within the prior art that the host interface controller might be commanded to transfer all sectors in the file. As will be recognized by those of skill in the art, such a command would in many circumstances result in overwriting of sectors that have been transferred to the buffer 48 by sectors later transferred to the buffer 48 before the overwritten sectors have been transferred to a disc. While this result could be avoided, at times, by selecting a larger buffer segment, such selection would result in inefficient use of the buffer.

Once the transfer command has been received by the host interface controller state machine 118, such state machine orchestrates byte-by-byte transfer of data from the host 22 to the FIFO 130 and from the FIFO 130 to the buffer 48 in a conventional manner. The byte transfers to the FIFO 130 are counted by the host data transfer circuit 146, as is conventional, and once a sector has been transferred to the FIFO 130, the host data transfer counting circuit provides a sector complete signal to the host interface controller state machine 118 in the usual manner. The host interface controller state machine 170 responds, again in the usual manner, to discontinue byte transfers from the host 22. In the present invention, the sector complete signal is further transmitted to the buffer manager 60 as a sector count signal whose purpose will be described below. The FIFO 130 is then cleared to the buffer 48.

In the prior art, the host interface controller state machine 170 is programmed to interrupt the system microprocessor 42 at this point to enable the system microprocessor 42 to maintain a count of sectors of data that have been transferred to the buffer 48. In the present invention, the host interface controller state machine is instead programmed to issue a clock signal to the sector counter 158 and check for a host pause on the signal path 168. If no host pause signal is present, the host interface controller 118 will coordinate with the host 22 and the buffer controller 52 to transfer a second sector of data, byte-by-byte, from the host 22 to the buffer 48. When a second sector has been transferred to the FIFO 130, the operations that occurred at the end of the first sector transfer will be repeated, and transfer of a third sector may commence. Such repetition of transfers will continue until the total number of files to be written has been transferred to the buffer with suspensions of additional sector transfers occurring only at such times that a host pause signal appears, and remains, on the signal path 168 from the buffer manager 60. Once the total file has been transferred to the buffer, a transfer complete signal from the sector counter 158 causes the host interface controller state machine 118 to carry out the same protocol steps required at the termination of file transfers in prior art disc drives and cause generation of an interrupt of the system microprocessor 42 that indicates the completion of transfer of the file to the buffer 48. Thus, in contrast to data transfer operations in prior art disc drives and with one exception, there is no intervention by the system microprocessor 42 during the transfer of the file from the host 22 to the buffer 48. The exception, which also occurs in prior art disc drives, is that a write fault occurs. In the case of a write fault, the microprocessor 42 is programmed, as is conventional, to discontinue writing the file until the write fault has been cleared, when writing is resumed.

While data is being transferred from the host 22 to the buffer 48, the servo circuit 40 will carry out a conventional seek operation to the track to which the data is be written and report the arrival of the read/write heads 32 at such track to the system microprocessor 42. Once the read/write heads have reached such track, the system microprocessor 42 enters the number of sectors to be written into the sector counter 180 and issues commands to the disc interface controller state machine 170 to transfer that number of sectors to the disc, beginning at the first sector that is to be used to store the file. In this respect, the invention differs from the prior art. In the prior art, the system microprocessor 42 determines whether any interrupts have been received from the host interface controller 54, indicating presence of data to be written in the buffer 48. If so, the system microprocessor 42 issues a command to the disc interface controller state machine 170 to begin writing a limited number of sectors once the correct sectors arrive at the read/write head 32.

Once the header search and compare logic 188 has detected the first sector to which data is to be written, byte-by-byte data transfers between the buffer 48 and serializer/deserializer 184 are carried out in a conventional manner. Data is serialized in the serializer/deserializer 184, and is transmitted to the read/write circuit 58 in a conventional manner. As bytes of data are transferred into the FIFO 172, they are counted by the disc data transfer counting circuit 178, which provides a data field complete signal to the disc interface controller state machine 170 once a sector of data has been transferred from the buffer 48. When the data field complete signal is received by the state machine 170, transfers from the buffer are terminated, as is conventional, the FIFO 172 is cleared to the serializer/deserializer 184 and thence to the read/write circuit in the usual manner. The disc interface controller state machine 170, the ECC circuit 186, and the serializer/deserializer then operate in coordination to append error check bytes to the data field, and the ECC circuit 186 issues ECC check complete signal to the disc interface controller state machine 170, as is conventional in the art. In the present invention, the ECC check complete signal, which occurs with the counting of each sector of data into the read/write circuit 58, is transmitted to the buffer manager 60 as a disc sector count signal for a purpose to be described below.

In the prior art, the reception of the ECC check complete signal initiates an interrupt to the system microprocessor 42 to enable the system microprocessor 42 to maintain a record of the status of the buffer 48. In the present invention, the disc interface controller state machine is programmed to instead clock the sector counter 180, check for the presence of a disc pause signal on the signal path 224, and in the absence of a disc pause signal, commence transfer of the next sector to the read/write circuit 58. Sector transfers are then repeated until the number of sector transfers for which the sector counter 180 has been initialized has been attained.

Reading of a data file is substantially the converse of writing, so that reading need not be described in detail for purposes of the present invention. Rather it will suffice to note the salient differences. The operation of the host interface controller 54 during reading differs from such operation during writing only in the direction in which data is transferred between the buffer 48 and the host 22. Thus, upon reception of a communication from the host 22 that specific sectors are to be read from a disc, commands are issued to the servo circuit to move the read/write heads 32 to the track on which such sectors are located, a buffer segment is selected and entered into the buffer controller 52 as in writing, and commands are issued to the host interface controller state machine 118 to transfer a number of sectors of data, equal to the number of sectors comprising the file to be read, from the buffer 48 to the host 22. In the absence of a host pause signal received by the host interface controller state machine 118, such number of sectors will be transferred in a conventional manner from the buffer 48 to the host 22 without the intervention of the system microprocessor 42. With each transfer of a compete sector to the FIFO 130 a host sector count signal is transmitted to the buffer manager 60, as in writing a file to a disc.

The operation of the disc interface controller 56 during reading differs from the operation of the controller 56 during writing in that syndromes are calculated as bytes of data and appended check bytes are transferred through the serializer/deserializer 184. These syndromes are made available to the microprocessor interface 171 at the conclusion of the transfer of each sector from the disc in a conventional manner, and the ECC check complete signal is concurrently transmitted to the disc interface controller state machine 170 to mark the completion of the transfer in the conventional manner. Should a read error occur, an error signal is transmitted to the state machine 170 to enable correction of a sector in the buffer 48 as has been described above. Thus, during reading, the sector counter 180 again receives a selected number of sectors to be read from the microprocessor 42, the disc interface controller state machine 170 is commanded to commence transfers when the first sector containing data in the file to be read reaches the read/write head 32, and the disc interface controller state machine 170 continues transfers until the number in the sector counter 180 has been reached. In the present invention, it is contemplated that such number will exceed the number of sectors in the file for a reason to be discussed below. In the absence of a disc pause signal received by the disc interface controller state machine 170, data transfers from the disc 26 to the buffer will commence when the first sector containing file data reaches the read/write head 32 with byte-by-byte transfer coordination being effected by the buffer controller 52, the read/write circuit 58, and the buffer coordination circuit 174 in the conventional manner Error signals are transmitted to the disc interface controller state machine 170, and ECC check complete signals are transmitted to the buffer manager 60 during reading as has been described above. It is to the buffer manager 60 that we now turn.

Figure 6:
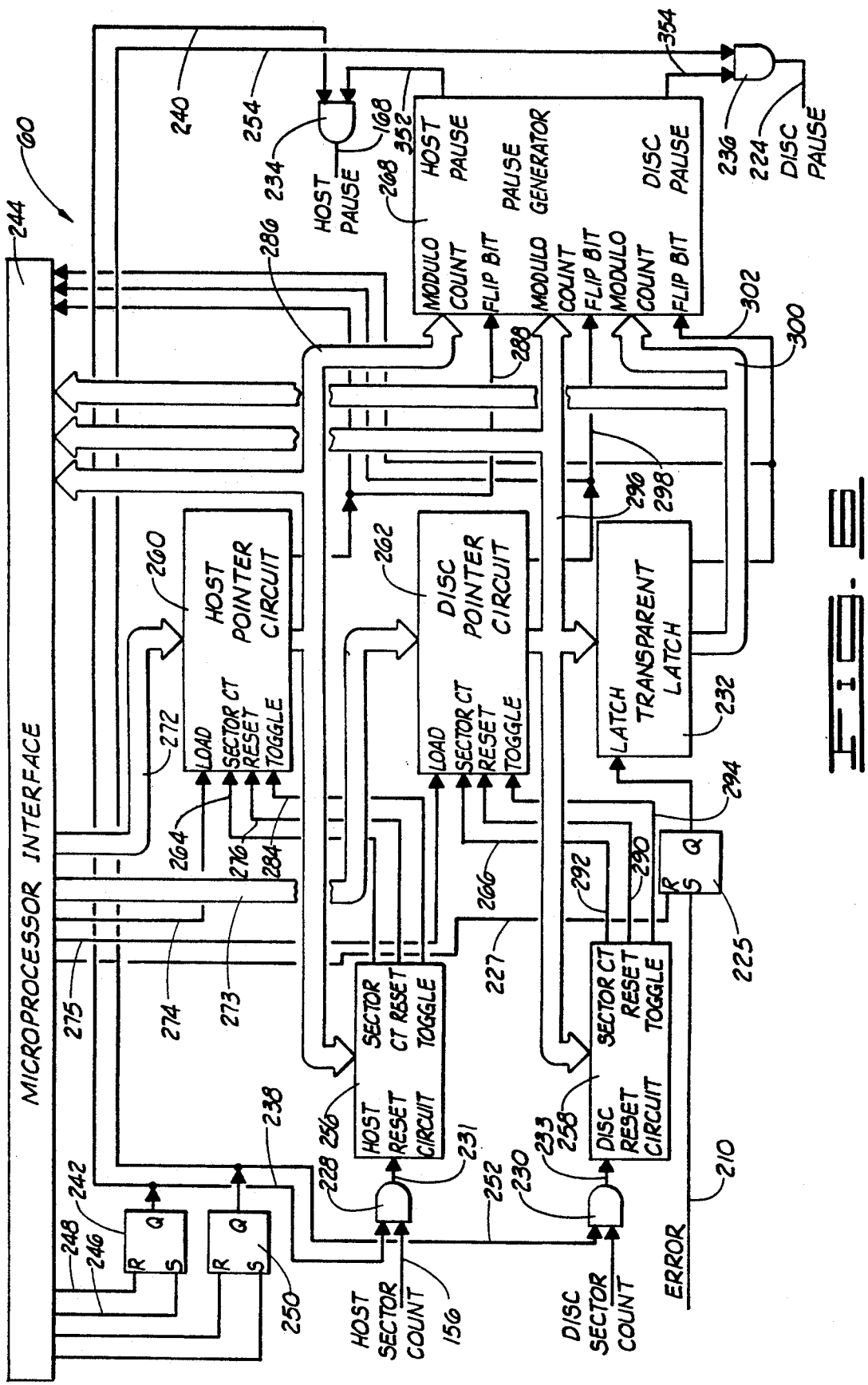
FIG. 6 is a functional block diagram of the buffer manager of the disc drive shown in FIG. 1.

Referring now to FIG. 6, the buffer manager 60 receives the host sector count signals on the signal path 156 from the host interface controller 54 at one input of an AND gate 228, the disc sector count signals on the signal path 216 from the disc interface controller 56 at one input of an AND gate 230, and error signals on the signal path 210 from the disc interface controller 56 at the set input of an RS flip flop 225. The Q output of the flip flop 225 is connected to the latch input of a transparent latch 232 and the flip flop 225 can be reset by the system microprocessor 42 via a microprocessor interface 244 and a signal path 227. The buffer manager 60 provides the host pause and disc pause signals to the host and disc interface controllers, 54 and 56 respectively, from the outputs of AND gates 234 and 236 respectively. The second input of the AND gate 228 and one input of the AND gate 234 are connected, via signal paths 238 and 240, to the Q output of an RS flip flop 242 that can be set by the system microprocessor 42 via a signal received on a signal path 246 from the microprocessor interface 244 or reset therefrom via a signal path 248. Thus, reception of host count signals on the signal path 156 and transmission of host pause signals on signal path 168 can be concurrently disabled from the microprocessor 42 by resetting the flip flop 242. Similarly, reception of disc count signals on the signal path 216 and transmission of disc pause signals on the signal path 224 can be concurrently disabled by resetting an RS flip flop 250 whose Q output is connected to inputs of the AND gate 230 and 236 via signal paths 252 and 254, respectively. The purpose of disabling the reception of host or disc sector count signals while concurrently disabling transmission of corresponding pause signals will be discussed below.

The outputs of the AND gates 228 and 230 are connected, via signal paths 231 and 233 respectively, to host and disc reset circuits, 256 and 258 respectively, that transmit the sector count signals to sector count terminals of host and disc pointer circuits, 260 and 262 respectively, via signal paths 264 and 266 respectively, during storage or retrieval of a file from a disc so that counting of the number of sectors transferred into and from the buffer 48 can be effected by the pointer circuits 260 and 262 in a manner and for a purpose to be described below. Such counts of sector transfers are transmitted to a pause generator 268, as will be described below, so that host and disc pause signals can be generated in relation to the number of sectors that have been transferred into the buffer 48 and the number of sectors that have been transferred from the buffer 48. Thus, as will be described more fully below, the buffer manager 60 eliminates the need for system microprocessor 42 intervention in the reading and writing of files to discs of the disc drive 20 to maintain the integrity of the files as they are transferred first into and then from the buffer 48.

Before describing these circuits of which the buffer manager 60 is comprised, it will be useful to first briefly discuss the organization of a buffer segment which receives and subsequently provides data that is transferred between the host 22 and disc 26. As is conventional in the art, the buffer segment base address and the buffer segment limit address are selected so that the buffer segment will contain an integral number of sectors of data. Thus, groups of buffer address locations, each capable of holding one sector of data, can be numbered, using modular arithmetic, from 0 to N−1, where N is the number of sectors the buffer segment can hold. Moreover, as discussed above with respect to FIG. 3, the host and disc address circuits 64 and 66 readdress the buffer 48 with the buffer segment base address each time a byte of data is entered into or removed from the memory location at the buffer segment limit address so that the buffer segment can be organized as a circular buffer in which each data storage location in the buffer can be reused to store a new data byte after a data byte previously stored at that location has been transferred from the buffer. Such organization is conventional and permits maximum effective use of the buffer 48. Thus, the buffer can be viewed as a collection of sector storage registers, numbered from 0 to N−1, which are repetitively addressed in order as data is transferred first into and then from the buffer 48 in the storage or retrieval of a file from a disc. This organization is mirrored in the construction of the host pointer circuit 260 which is more particularly shown in FIG. 7.

Figure 7:
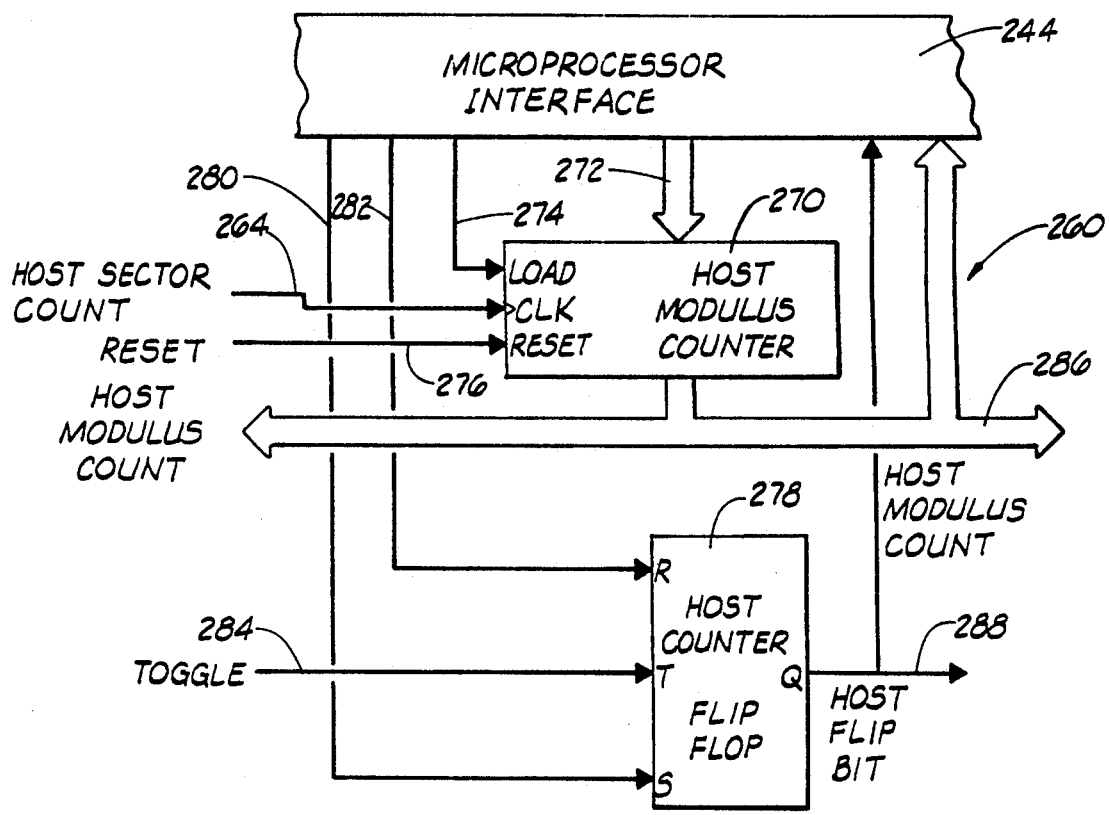
FIG. 7 is a block diagram of the host pointer circuit of the buffer manager shown in FIG. 6.

As shown in FIG. 7, the host pointer circuit 260 is comprised of a conventional counter, referred to herein as a host modulus counter 270, of the type that can be preloaded by impressing a selected binary number at data inputs of the counter and delivering a load pulse to a load input of the counter. Both the binary number and the load pulse are provided by the system microprocessor 42, via the microprocessor interface 244, bus 272, and signal path 274, and the system microprocessor is programmed to load a selected number into the counter 270 at a time that will be discussed below. The host modulus counter 270 is further of the type that can be reset by a pulse received at a reset terminal thereof, and such signal is provided at specific times to be discussed below, on a signal path 276 from the host reset circuit 256. At other times, the host sector count signals on the signal path 264 from the host reset circuit 256 are received at a count input of the host modulus counter 270 so that the operation of the host sector count pulses, beginning with 0, received from the host reset circuit 256. As will be clear to those of skill in the art, the host modulus counter can also be caused to count from any selected number by reloading the counter 270 from the system microprocessor 42 as has been described above.

In addition to the host modulus counter 270, the host pointer circuit 260 is further comprised of an RST flip flop, referred to herein as the host counter flip flop 278, that can be set or reset from the system microprocessor 42 via the interface 244 and signal paths 280 and 282, and toggled from the host reset circuit 256 via a toggle signal path 284. The Q output of the host counter flip flop 278 provides a host flip bit for a purpose that will be described below. Referring once again to FIG. 6 and with continuing reference to FIG. 7, the host modulus count in the host modulus counter 270 and the host flip bit stored by the host counter flip flop 278 are transmitted to the pause generator 268 via a bus 286 and a signal path 288 connected to the data outputs of the counter 270 and the Q output of the flip flop 278, respectively. The bus 286 and the signal path 288 can also be extended to the microprocessor interface 244 to enable reading of the host modulus count and the host flip bit for diagnostic and test purposes.

The disc pointer circuit 262 is identical to the host pointer circuit 260 and operates in the same manner as the host pointer circuit 260. Thus, the disc pointer circuit comprises a disc modulus counter (not shown), that can be loaded via bus 273 and signal path 275 from the microprocessor interface 244 and can be reset by a reset signal received from the disc reset circuit 258 on a signal path 290 to subsequently count sector count signals received from the disc reset circuit 258 on a signal path 292, and a disc counter flip flop (not shown) that can be set or reset from the system microprocessor 42 and toggled by a toggle signal received from the disc reset circuit 258 on a signal path 294. Thus, the disc pointer circuit 262 provides a disc modulus count that is transmitted to the pause generator on a bus 296 and a disc flip bit that is transmitted to the pause generator 268 on a signal path 298. Extensions of the bus 296 and signal path 298 to the microprocessor interface 244 to permit the disc modulus count and disc flip bit to be read by the system microprocessor 42 provide an alternative manner of locating a sector in the buffer 48 that has been read with an error, as will be discussed below.

The bus 296 and signal path 298 that provide the disc modulus count and the disc flip bit to the pause generator 268 are also extended to inputs of the transparent latch 232 so that the disc modulus count and the disc flip bit are latched into the transparent latch 232 when, as a result of an error during reading of a sector, an error signal from the ECC circuit 186 sets the flip flop 225. Thus, the latch 232 provides a latch modulus count and a latch flip bit, corresponding to locations in the buffer 48 that contain sectors read with errors, and such latch modulus count and latch flip bit are transmitted to the pause generator 268 on a bus 300 and a signal path 302 for purposes to be discussed below. As in the case of the buses and signal paths between the host and disc pointer circuits 260 and 262 and the pause generator 268, the bus 300 and signal path 302 can be extended to the microprocessor interface 244 to permit reading of the contents of the latch 232 for diagnostic and test purposes.

Figure 8:
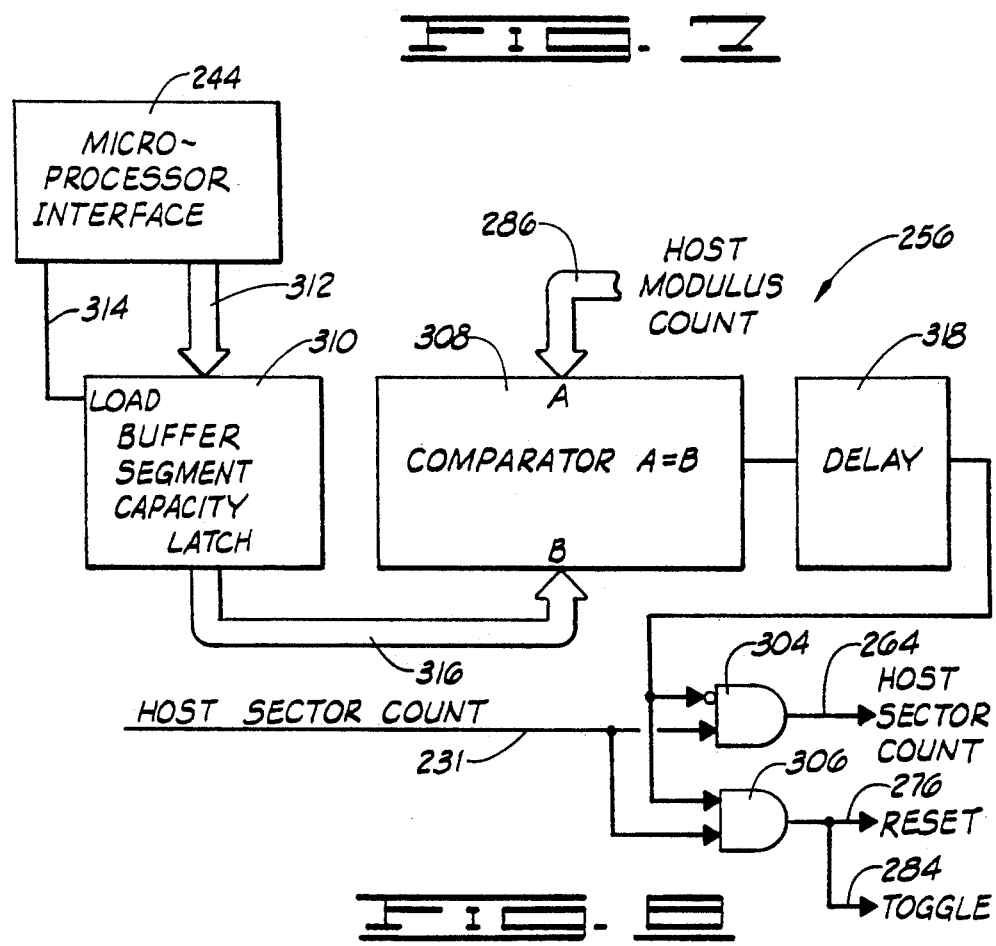
FIG. 8 is a block diagram of one preferred embodiment of the host reset circuit of the buffer manager shown in FIG. 6.

Referring now to FIG. 8, shown therein is one preferred construction for the host reset circuit 256. In the host reset circuit 256, host sector counts appearing on the signal path 231 from the output of the AND gate 228, at such times that the AND gate 228 is enabled by setting the flip flop 242, are transmitted to one input of each of two AND gates, 304 and 306, which provide host sector count, reset, and toggle signals to the host pointer circuit 260. More particularly, the signal path 264 to the sector count input of the host pointer circuit 260 extends from the output of AND gate 304, while the signal paths 276 and 284, providing reset and toggle signals respectively to the host pointer circuit 260, extend from the output of AND gate 306. Thus, at such times that AND gate 304 is enabled, a sector count signal received by the host reset circuit 256 is transmitted to the host modulus counter 230 to increment the host modulus count. Conversely, when the AND gate 306 is enabled, a host sector count signal received by the host reset circuit 256 will pass the host sector count signal to the reset input of the host modulus counter 270 to reset the host modulus count to zero, and concurrently pass the host sector count signal to the toggle input of the host counter flip flop 278 to change the logic value, 1 or 0, of the host flip bit.

In addition to the AND gates 304 and 306, the host reset circuit is comprised of a comparator 308 that receives the host modulus count on the bus 286 at a set of data inputs, the A inputs, such bus extending back to the host reset circuit 256 for this purpose. The other set of data inputs, B inputs, receive the contents of a latch, referred to herein as a buffer segment capacity latch 310, that can be loaded from the system microprocessor 42 via the microprocessor interface 244, a bus 312 from the interface 244 to data inputs of the latch 310, and a signal path 314 to a load input of the latch 310. The contents of the buffer segment capacity latch 310 are transmitted to the B inputs of the comparator 308 on a bus 316, and the comparator 308 is of the type that compares numbers expressed in a binary code at its A and B inputs and provides an output signal at such times that the numbers are equal. Such signal is passed through a delay 318 to an inverting input of the AND gate 304 and a noninverting input of the AND gate 306.

In the practice of the present invention, the latch 310 is loaded with the value corresponding to the number of sectors that the buffer segment defined by the system microprocessor 42 can contain less one. Thus, each time the host modulus counter has counted to the value stored in the buffer segment capacity register, the AND gate 304 will be disabled and the AND gate 306 will be enabled. With the next host sector count received by the reset circuit 256 on the signal path 231, the host reset circuit 256 will provide reset and toggle signals on the signal paths 276 and 284 to reset the host modulus counter 270 and toggle the host counter flip flop 278. With reset of the host modulus counter 270, the host modulus count at the A input of the comparator 308 will become unequal to the buffer segment capacity expressed at the B input of the comparator 308 to terminate the signal from the comparator 308 to the AND gates 304 and 306. As a result, the AND gate 304, which receives the comparator 308 output at an inverting input, will become enabled, while the AND gate 306 will become disabled so that subsequent host sector count signals will be transmitted to the sector count input of the host modulus counter 270. Thus, it will be seen that the response of the host reset circuit 256 and the host pointer circuit 260 to a series of host sector count signals received on the signal path 156 from the host interface controller 54 and transmitted via the AND gate 228 in FIG. 6 to the host reset circuit will be to repetitively count such host sector count signals in modular arithmetic and toggle the host counter flip flop each time the count is reset to zero.

The disc reset circuit 258 is identical to the host reset circuit 256 and coacts with the disc pointer circuit 262 in the same manner that the host reset circuit 256 coacts with the host pointer circuit 260 to repetitively count disc sector count signals in modular arithmetic and toggle the disc flip bit each time the count is reset to zero.

Since, as has been described above, the sector count signals are generated by the host and disc interface controllers 54 and 56 each time a sector of data is transferred between the host 22 and buffer 48 and between the buffer 48 and disc 26, it will be seen that the host and disc modulus counts provide indications in modular arithmetic of the number of sectors that have been transferred between the host 22 and buffer 48 and between the buffer 48 and a disc 26, respectively. Similarly, the host and disc flip bits provide indications of the parity of the number of times that the host modulus counter 270 and the disc modulus counter have been reset. While such parity indications might be expressed directly by associating a logic level 0 at the output of the host or disc counter flip flop with an even number of transfers of the buffer segment capacity and a logic level 1 with an odd number of transfers of the buffer segment capacity, such is not necessary. As will be seen in the discussion of the operation of the disc drive 20 to follow, it is the relationship between the parity indications expressed by the host and disc counter flip flops, rather than the parities per se, that is used in the operation of the buffer manager 60 to maintain sector level control of data transfers between the host 22 and disc 26.

FIG. 9 illustrates an alternative construction for the host reset circuit, designated 256A, that enables resetting of the host modulus counter 270 and toggling of the host counter flip flop 278 via signals on the signal path 114 of FIGS. 2 and 3 that are used to load the buffer segment base address into the host address counter 92 of the host address circuit 64. In the host reset circuit 256A, the signal path 114 from the host address counter 92 is received by the clock input of a type D flip flop 320 having a D input connected to a pull-up 322. Thus, each time the buffer segment address is returned to the buffer segment base address, a logical 1 is clocked into the Q output of the flip flop 320 and a logical zero is clocked into the $\overline{Q}$ output. These outputs are connected, respectively, to one input of an AND gate 324 whose output provides the reset and toggle signals to the host sector transfer counter circuit 260 and one input of an AND gate 326 whose output provides sector count signals to the host sector transfer counter circuit 260. The other input of each of the gates 324 and 326 receives sector count signals from the host interface controller 54 on the signal path 156, and the sector count signals are, in addition, transmitted via a delay 328 to the reset input of the flip flop 320. Thus, each time a byte is transferred into the buffer segment limit address, an active high logic level will be clocked into the Q output of the flip flop 320 and an active low into the $\overline{Q}$ output to enable the gate 324 while disabling the gate 326. When the next host sector count signal is received from the host interface controller 54, such signal will be transmitted by the AND gate 324 to reset the host modulus counter 270 and toggle the host counter flip flop 278 and, after a delay, will be transmitted to the reset input of the flip flop 320 to reset such flip flop to enable the AND gate 326 and disable the AND gate 324 so that subsequent host sector count signals will be transmitted to the cock input of the host modulus counter 270. The disc reset circuit 258 can similarly have the construction shown in FIG. 9.

Figure 10:
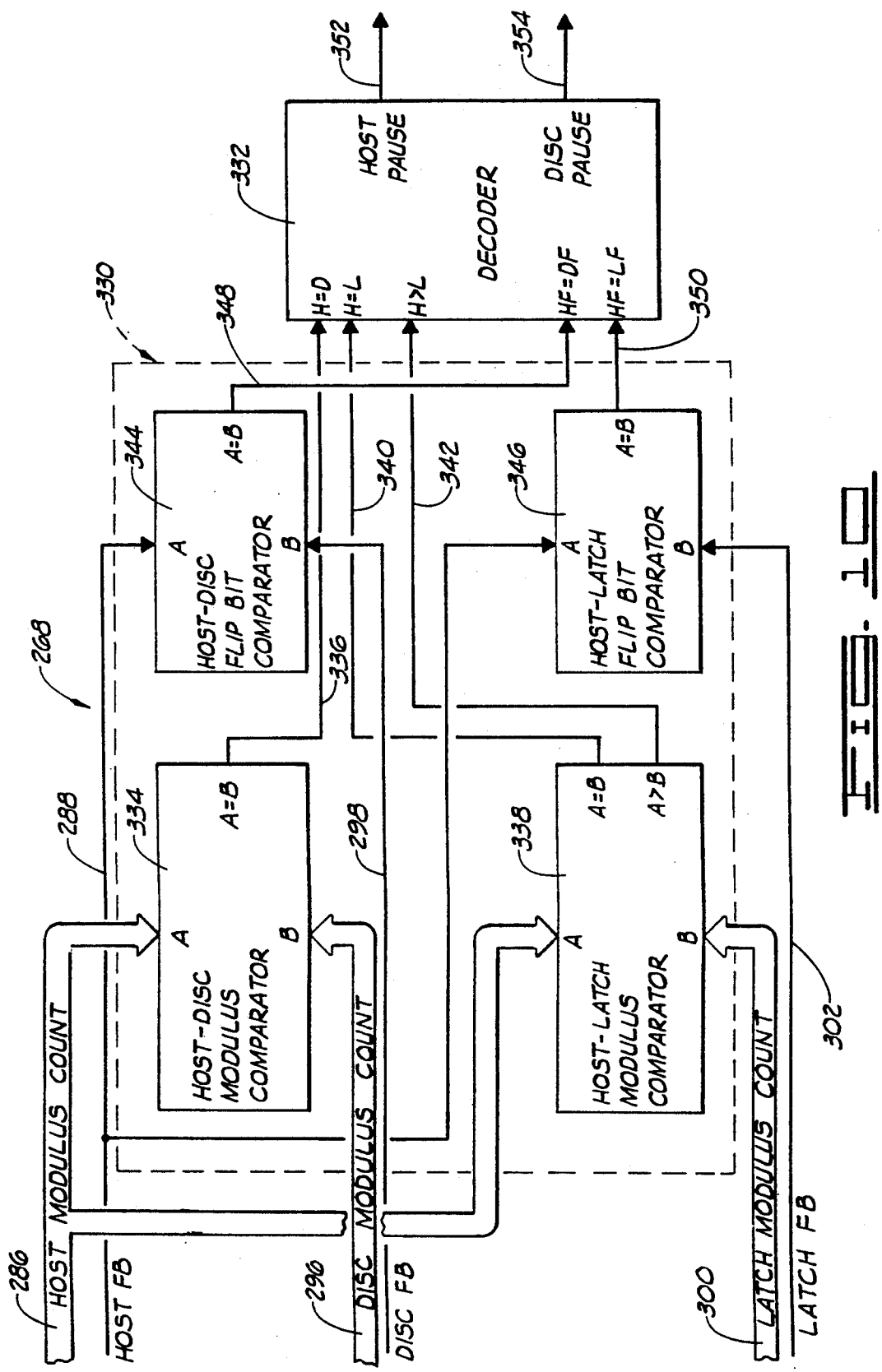
FIG. 10 is a block diagram of the pause generator of the buffer manager shown in FIG. 6.

Referring now to FIG. 10, shown therein is a preferred construction for the pause generator 268 of the buffer manager 60. In general, the pause generator 268 is comprised of a comparator circuit 330 which compares the numbers of sector transfers that have taken place between the host 22 and the buffer 48 to the number of sector transfers that have taken place between the buffer 48 and disc 26 during reading or writing of data and a decoder 332 which receives the results of the comparisons and generates host and disc pause signals that prevent overwriting of data that has been transferred into the buffer 48 prior to transfer of such data from the buffer 48 and further prevents transfer of data from the buffer until at least one sector is available.

To this end, the comparator circuit 330 is comprised of a comparator 334 which receives, at A and B inputs, the host and disc modulus counts on the buses 286 and 296 from the host and disc sector transfer counting circuits 260 and 262, respectively, and provides a signal indicative of equality of such modulus counts on a signal path 336 to one input, referred to herein as an H=D input, of the decoder 332. The host and latch modulus counts are similarly compared by a comparator 338 which, for reasons that will become clear below, is of the type that provides not only a signal indicating equality of the host and latch modulus counts but, in addition, a signal that indicates that the host modulus count is greater than the latch modulus count when such condition exists. The signals are transmitted to H=L and H>L inputs of the decoder 332 on signal paths 340 and 342, respectively.

In addition to comparing the modulus counts, the comparator circuit 330 also compares the host, disc, and latch flip bits, the comparator circuit 330 being comprised of a comparator 344 for comparing the host flip bit to the disc flip bit and a comparator 346 for comparing the host flip bit to the latch flip bit for this purpose. A signal indicative of equality of the host and disc flip bits is provided to an HF=DF input of the decoder 332 on a signal path 348, and a signal indicative of equality of the host and latch flip bits is similarly provided to an HF=LF input of the decoder 332 on a signal path 350.

The decoder 332 is a conventional combinatorial logic circuit that presents disc pause signals to the AND gate 236 shown in FIG. 6 via a signal path 354 and presents host pause signals to the AND gate 234 via a signal path 352 in accordance with the truth tables shown in tables I and II.

TABLE I

| INPUTS | | OUTPUT |
|---|---|---|
| H = D | HF = DF | Disc Pause |
| 0 | 0 | 0 |
| 0 | 1 | 0 |
| 1 | 0 | 1 |
| 1 | 1 | 0 |

TABLE II

| INPUTS | | | OUTPUT |
|---|---|---|---|
| H = L | H > L | HF = LF | Host Pause |
| 0 | 0 | 0 | 1 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |

OPERATION

To provide a basis for discussing management of data transfers at the sector level between the host 22 and disc 26 of the disc drive 20, it will be useful to briefly summarize the operation of the host and disc interface controllers 54 and 56 and the buffer controller 52. As described above, these controllers coordinate data transfers into and out of the buffer 48, at the byte level, in a conventional manner, and enter into sector level transfer control only in that operation of the host and disc interface controllers are programmed to suspend transfers at the sector level in response to host and disc pause signals received from the buffer manager 60. Otherwise, both the host and disc interface controllers will follow transfer of one sector of data with transfer of another sector of data until the total number of sectors that have been transferred has reached the numbers that are entered into the sector counters 158 and 180 by the system microprocessor 42 prior to commencement of the transfers.

In the case of writing of data to a disc, both numbers of sectors to be transferred (from the host 22 to the buffer 48 and from the buffer 48 to disc 26) can be the total number of sectors in a file to be stored. Thus, the present invention contemplates that the system microprocessor 42 will not intervene in either transfer, once the writing commences, until all data in a file to be stored has been completed. When a file is read from a disc, it is conventional practice to transfer succeeding sectors of data to the buffer 48 to provide for rapid file retrieval at times that the host 22 calls for transfer of another file located in disc sectors that follow a previously read file. As is known in the art, this is often the case. The present invention contemplates the practice of this "lookahead" feature in the reading of files from a disc, and the construction of the buffer manager 60 as has been described above is well-suited for implementing the feature in a manner that will be described below. Thus, when a file is to be read in the disc drive 20, the number of sectors to be transferred by the host interface controller 54 will generally be made equal to the number of sectors comprising the file, while the number to be transferred by the disc interface controller 56 will generally be made equal to a larger number.

When a file is to be stored or retrieved from a disc, the host interface, disc interface, and buffer controllers, 54, 56, and 52 respectively, are initialized as has been described above, and as has also been described above, the read/write heads 32 are moved to the track to which the file is to be written or from which it is to be read. Both interface controllers are commanded to begin transferring data, one interface controller receiving a command to transfer data into the buffer 48 and one receiving a command to transfer data from the buffer. Prior to the issuance of these commands, the buffer manager is initialized as will now be described Initially, the system microprocessor 42 enters the capacity, expressed as the number of sectors less one, that a selected buffer segment is to contain into the buffer segment capacity latches 310 of the reset circuits 256 and 258, and selected numbers are entered into the modulus counters of the pointer circuits 260 and 262. The counter flip flops 278 of the host and disc pointer circuits 260 and 262 are selectively set or reset to provide indications of the parities of the numbers of times the modulus counters are reset to zero during transfer of data between the host 22 and a disc. More particularly, and with one exception, any convenient number (for example, zero) is entered into both modulus counters 270, and the counter flip flops 278 are set or reset on the basis of whether data is to be written or read. When data is to be written to a disc, one counter flip flop 278 is set while the other is reset; when data is to be read from a disc, both are either set or reset. The exception is the case in which read lookahead is exploited and will be discussed below. Finally, the flip flops 242 and 250 in FIG. 6 are set from the system microprocessor 42, via the interface 244, so that any host or disc sector count that is generated by the host or disc interface controllers 54 and 56 will be received by the reset circuits 256 and 258, and any pause signal generated by the pause generator 268 will be transferred to the appropriate host or disc interface controller 54 or 56. Once these initialization steps have been completed, data transfer commands are issued to the host and disc interface controllers, 54 and 56 respectively, and the system microprocessor 42 turns to control of other disc drive functions without further intervention in the data transfer excepting circumstances in which a write fault occurs or a sector is read with an error or errors. Microprocessor intervention in the case of a write fault has been discussed above. Intervention in the case of a sector read with an error or errors will be discussed below.

It will be useful in the discussion of the operation of the buffer manager 60 to issue pause signals that will suspend transfer of data at the sector level to the host and disc interface controllers 54 and 56 to consider three cases: (1) storage or error-free retrieval of a file to or from a disc; (2) retrieval of a file in which read errors occur in a sector read from a disc; and (3) read lookahead. These will be discussed in turn.

During writing of data to a disc or error-free reading, no error signals will be generated by the ECC circuit 186 so that the contents of the transparent latch 232 will be the disc modulus count and disc flip bit currently in the disc sector transfer counter circuit 262. Thus, the latch and disc modulus counts and the latch and disc flip bits can be treated interchangeably, and the first, third, and last columns of Table II can be viewed as providing a truth table for comparisons of the host and disc modulus counts and host and disc flip bits.

At the time that writing a file to a disc is initialized, the host and disc modulus counts will be the same, but the host and disc flip bits will be different. (For purposes of example, it may be assumed that the host and disc modulus counts are initially zero.) Thus, the H=L input of the decoder will receive a logical 1 from the comparator 338 and the HF=LF input will receive a logical zero from the comparator 346. Consequently, as can be seen from the fifth line of Table II, the HPause output will be a logical zero so that no pause signal is transmitted to the host interface controller 54, and transfer of data into the buffer 48 from the host 22 will be effected by the controller 54. However, since the host and disc modulus counts will be the same and the host and disc flip bits will be different, the DPause output will be a logical 1 to suppress transfer of data from the buffer 48 to disc 26. Such suppression will continue until a sector has been transferred into the buffer 48 from the host 22 to increment the host modulus count.

With the increment of the host modulus count, the host modulus count becomes greater than the disc modulus count, with the result that the applicable line of Table I becomes the first line, and the disc pause will be discontinued. The increment of the host modulus count will have no effect on the host pause as can be seen from the third line of Table II.

At the time that data transfers to the disc 26 are enabled, the disc sector that is to contain the first file sector may not yet have reached the read/write head, so that a possibility exists that a number of sectors of data may be transferred into the buffer 48 with no sectors being transferred therefrom. Indeed, the number of such sector transfers may equal the capacity of the buffer segment, so that the host modulus count may reach the value of the buffer segment capacity register and subsequently be reset to zero. When this occurs, the host flip bit will be toggled. Thus, comparator 338 will again provide a logical 1 to the H=L input of the decoder 332. Because of the toggling of the host flip flop 278, the comparator 346 will now provide a logical 1 to the HF=LF input of the decoder 332. Accordingly, a host pause signal will be generated in accordance with the last line of Table II. Thus, no further sectors of data can be transferred into the buffer segment.

If at any time during the transfer sequence the disc empties the buffer segment of all available data, a disc pause will generated. Once at least a sector of data has been transferred into the buffer, neither disc nor host transfers are paused until the buffer segment has become filled or emptied.

This operation of the buffer manager 60 to pause disc transfers at any time that the buffer segment empties and to pause host transfers at any time the buffer segment becomes filled is general. More particularly, in either case, the host, disc, and latch modulus counts will be the same but the two cases are distinguished by the flip bits. If the host flip bit differs from the disc and latch flip bits, the host and disc modulus counters will have been reset the same number of times and the number of sectors that have been transferred from the buffer will equal the number that have been transferred to the buffer. That is, the buffer is empty. In such case, disc transfers are paused in accordance with the third line of Table I, but host transfers are permitted to continue in accordance with the fifth line of Table II. Conversely, if the flip bits have become the same, the number of sectors that have been transferred into the buffer from the host will exceed the number that have been transferred from the buffer by the capacity of the buffer segment, and host transfers will be paused in accordance with the last line of Table II, while disc transfers will be permitted to continue in accordance with the last line of Table I. For intermediate cases, in which the number of sectors that have been transferred to the buffer 48 from the host 22 exceeds the number of sectors that have been transferred from the buffer to a disc, no host pause will be generated in accordance the third line of Table II, and no disc pause will be generated in accordance with the first two lines of Table I.

As noted above, once a complete file has been transferred from the host 22 to the buffer 48, such fact will be communicated to the system microprocessor 42 via an interrupt signal generated by the host interface controller 54. In the practice of the present invention, the system microprocessor is programmed to reset the flip flop 250 (FIG. 6) to interrupt transmission of disc sector counts to the disc reset circuit 258 while interrupting transmission of disc pause signals to the disc interface controller 56. Thus, transfers from the buffer 48 to the disc 26 will continue without pause as sectors of the disc reach the read/write head 32 until writing of all sectors of the file gives rise to an interrupt from the disc interface controller 56, signalling the completion of writing. Such feature permits the system microprocessor 42 to receive a new write command from the host, define a new buffer segment, and commence transfers of data to the new buffer segment while completion of writing of the previous file takes place to facilitate rapid writing of the new file to a disc.

For reading of data from a disc, the host and disc flip bits are initialized to the same logic level, and such reversal from the case in which data is written to the disc reverses the generation of host and disc pauses at times that the buffer segment is empty or full. At times that the buffer segment is empty, the last line of Table II will apply, and data transfers to the host 22 will be paused, while data transfers from the disc may proceed in accordance with the last line of Table I. At such times that the buffer is filled, data transfers from the disc are paused in accordance with the third line of Table I, while data transfers to the host may continue in accordance with the fifth line of Table II.

When an error in reading a sector of data occurs, the ECC circuit 186 produces an error signal that is transmitted to flip flop 225 to set the flip flop 225 and latch the contents of the disc modulus counter and disc flip flop into the transparent latch 232. As noted above, the error signal precedes the disc sector count signal so that the latch modulus count will be the disc modulus count for the sector for which the error has occurred. The error signal will also result in an interrupt of the system microprocessor 42 so that the error can be corrected as described above, but since discontinuance of the data transfers from the disc 26 is governed by the buffer manager 60, data transfers from the disc to the buffer may continue as if no error had been detected. Specifically, data transfers from the disc will be paused only at such times that the buffer segment becomes filled to capacity in accordance with the third line of Table I. However, since the latch modulus count and latch flip bit are now frozen at the sector in which the read error occurred, data transfers to the host are paused when the host modulus count and host flip flop become equal to the latch modulus count and latch flip flop, respectively. More particularly, if the latch modulus count is greater that the host modulus count and the host and latch flip bits are the same, or if the host modulus count is greater than the latch modulus count and the host flip bit is different from the latch flip bit, the buffer segment will contain error free data that has yet to be transferred to the host, and data transfers will be made to the host in accordance with the second or third line of Table II. If, on the other hand, all error free data that has been transferred to the buffer from the disc has been transferred to the host 22, the latch and host modulus counts will be equal and the host and latch flip bits will be equal, with the result that host transfers will be paused in accordance will the last line of Table II. Once the error has been corrected, the system microprocessor 42 resets the flip flop 225 so that the latch modulus count and the latch flip bit again become the same as the disc modulus count and the disc flip bit, and data transfers to and from the buffer 48 proceed as in the error free case described above.

The capacity of the buffer manager 60 to manage sector level data transfers when read lookahead is employed in the reading of a file is implemented by the use of a comparator, the comparator 338 in FIG. 10, that provides an indication of the relative sizes of the host modulus count and the latch modulus count, as well as equality of such counts, to the decoder 332. In the practice of the invention, it is contemplated that all sectors with errors that are transferred to the buffer 48 from disc 26, whether such sectors are those requested by the host or not, will be corrected. It is for this reason that read lookahead is implemented with the comparator 338 rather than the comparator 334 that compares the host and disc modulus counts. Such operation prevents having to correct or reread a sector of file if the host subsequently calls for reading of sectors which have been read with errors. As is known in the art, computers are at times programmed to interleave disc sectors in which separate files are stored, so that the host 22 may request a file that is stored between previously requested files.

As noted above, read lookahead is implemented by a command to the disc interface controller to transfer more sectors of data to the buffer 48 than the requested file contains, so that the buffer segment can be loaded with sectors of data that the system microprocessor 42 is programmed to anticipate as the next sectors of data to be read from a disc. Should such sectors be requested, all that is necessary to commence transfers of sectors to the host 22 is a command to the host interface controller 54 to commence transfers of data to the host 22. Such command will be issued when the new file is requested without regard to whether the reading of the additional sectors has been completed. The new read command to the disc interface controller will be issued after the anticipated sectors have been read.

As has been noted, the sectors that have been loaded into the buffer segment may include sectors from another file between the current address in the host address circuit 64 and the address at which the requested file begins. In such case, the host address counter 92 is advanced to the location at which the new file begins, and the host modulus counter 230 and host flip bit 278 are initialized to reflect such location had the previous read operation extended to the host address at which the initial byte of the new file is located.

The manner in which the buffer manager issues host pauses in such case to prevent sectors entered into the buffer segment pursuant to the previous read operation but not included in the newly requested file from being transferred to the host 22 can be explained with respect to the first and fourth lines of Table II. If, at the time that the command to transfer the new file to the host is received, the transfer of the previous file from the disc has yet to be completed, and further, if the number of additional sectors that have been transferred to the buffer as a part of the previous read operation is less than the number of such sectors that are not a part of the newly requested file, two situations may exist. The host modulus count may be greater than the latch modulus count for host and latch flip bits that are the same, or the the host modulus count may be less than the latch modulus count for host and latch flip bits that are different. In the first case, data transfers to the host will be paused in accordance with the fourth line of Table II. In the second case a host pause will be generated in accordance with the first line of Table II.

Once the first sector of the new file is reached and transfer of such sector into the buffer commences, the disc modulus count will become the same as the host modulus count that was entered into the host modulus counter, and the host and disc flip bits will become the same. If no errors have been detected in the reading of the sectors, the transfer of sectors to the host will remained paused in accordance with the last line of Table II in the same manner that has been described above with respect to error free reading. Once an additional sector has been transferred to the buffer from the disc, host transfers commence in accordance with the third line of Table II. If read errors have occurred, such commencement of host transfers will occur after the errors have been corrected, and the latch modulus count and latch flip bit become the same as the disc modulus count and disc flip bit, as has been described above. Thus, once the buffer contains at least one error free sector of the new file, transfer of data to the host 22 will commence.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive for storing data received from a host to at least one rotating disc of which the disc drive is comprised and returning previously stored data to said host, wherein the disc drive is of the type wherein data transfers between the host and a disc of the disc drive are effected by transferring sectors of data from one of the host and the disc to a segment of a buffer, said segment selected to temporarily store a selected number of data sectors, and subsequently transferring each sector of data from the buffer segment to the other of the host and the disc and wherein the disc drive is characterized as including:

host data transfer counting means for counting data transfers between the host and the buffer segment and providing a host sector count signal indicative of each transfer of a sector of data between the host and the buffer segment;

disc data transfer counting means for counting data transfers between a disc and the buffer segment and providing a disc sector count signal indicative of each transfer of a sector of data between the disc and the buffer segment; and transfer coordinating means for coordinating said data transfers between the host and the buffer segment and between a disc and the buffer segment, the improvement wherein the transfer coordinating means is further characterized as a means for suspending data transfers between the host and the buffer segment in response to a host pause signal and as a means for suspending data transfers between the buffer segment and a disc in response to a disc pause signal and wherein the disc drive further comprises a buffer manager comprising:

host pointer means connected to the host data transfer counting means for counting host sector count signals to provide an indication of the number of sectors of data transferred between the host and the buffer segment;

disc pointer means connected to the disc data transfer counting means for counting disc sector count signals to provide an indication of the number of sectors of data transferred between the disc and the buffer segment; and pause generation means connected to the host pointer means and the disc pointer means for comparing the number of sectors transferred to the buffer with the number of sectors transferred from the buffer and providing a selected one of the host pause and disc pause signals to the transfer coordinating means at such times that the number of sectors of data that have been transferred from the buffer segment is equal to the number of sectors of data that have been previously transferred into the buffer segment and transmitting a selected one of the host pause and disc pause signals to the transfer coordinating means at such times that the number of sectors of data that have been transferred into the buffer segment exceeds the number of sectors of data that have been transferred out of the buffer segment by said selected number of sectors stored by the buffer segment.

2. The disc drive of claim 1 further comprising:

error detection means for detecting errors in data transmitted from a disc to the buffer segment and providing an error signal indicating of the transfer of a sector containing errors to the buffer segment; and means for correcting data sectors containing errors in the buffer; wherein the buffer manager further comprises a transparent latch connected to the disc pointer means for storing said indication of the number of sectors that have been transferred between the disc and the buffer in response to an error signal received from the error detection means; and wherein the pause generation means is further characterized as a means for comparing the indication of the number of sectors stored in the transparent latch to the indication of the number of sectors transferred between the host and the buffer and transmitting a host pause signal to the transfer coordinating means at such times that the number indications stored by the transparent latch is equal to the indication of the number of sectors transferred between the host and the buffer.

3. The disc drive of claim 2 wherein the buffer manager further comprises:
  means for disabling reception of host sector count signals by the host pointer means and concurrently disabling transmission of host pause signals to the transfer coordinating means; and
  means for disabling reception of disc sector count signals by the disc pointer means and concurrently disabling transmission of disc pause signals to the transfer coordinating means.

4. The disc drive of claim 2 wherein the host pointer means comprises:
  a host modulus counter for receiving the host sector count signals and responsive to reset signals for repetitively providing a modular arithmetic indication of the number of host sector count signals received by the host pointer means; and
  a host counter flip flop responsive to a toggle signal for providing a host flip bit indicative of the parity of the number of times the host modulus counter has received a reset signal;
wherein the disc pointer means comprises:
  a disc modulus counter for receiving the host sector count signals and responsive to reset signals for repetitively providing a modular arithmetic indication of the number of disc sector count signals received by the disc pointer means; and
  a disc counter flip flop responsive to a toggle signal for providing a disc flip bit indicative of the parity of the number of times the disc modulus counter has received a reset signal;
and wherein the buffer manager further comprises:
  host reset means for resetting the host modulus counter and toggling the host counter flip flop each time the host modulus counter counts to the modular arithmetic value corresponding to said number of sectors storable by the buffer segment; and
  disc reset means for resetting the disc modulus counter and toggling the disc counter flip flop each time the disc modulus counter counts to the modular arithmetic value corresponding to said number of sectors storable by the buffer segment.

5. The disc drive of claim 4 wherein the buffer manager further comprises:
  means for disabling reception of host sector count signals by the host pointer means and concurrently disabling transmission of host pause signals to the transfer coordinating means; and
  means for disabling reception of disc sector count signals by the disc pointer means and concurrently disabling transmission of disc pause signals to the transfer coordinating means.

6. The disc drive of claim 4 wherein the pause generation means comprises:
  a host-disc modulus comparator connected between the host modulus counter and the disc modulus counter for providing a signal indicative of equality of the contents of the host modulus counter and the disc modulus counter:
  a host-disc flip bit comparator connected between the host counter flip flop and the disc counter flip flop for providing a signal indicative of equality of the host and disc flip bits;
  a host-latch modulus comparator connected between the host modulus counter and the transparent latch for providing a signal indicative of equality of the contents of the host modulus counter and the modular arithmetic count provided by the disc modulus counter and stored by the transparent latch in response to an error signal;
  a host-latch flip bit comparator connected between the host counter flip flop and the transparent latch for providing a signal indicative of equality of the host flip bit and the disc flip bit provided by the disc counter flip flop and stored by the transparent latch in response to an error signal; and
  a decoder connected to the outputs of said comparators for generating the host pause and disc pause signals in relation to the pattern of signals received from the comparators.

7. The disc drive of claim 6 wherein the host-latch modulus comparator is further characterized as being of the type that provides a signal indicative of the relative sizes of the counts compared thereby in addition to the signal indicative of equality of said counts; and wherein both of said signals are transmitted to the decoder.

8. The disc drive of claim 1 wherein the host pointer means comprises:
  a host modulus counter for receiving the host sector count signals and responsive to reset signals for repetitively providing a modular arithmetic indication of the number of host sector count signals received by the host pointer means; and
  a host counter flip flop responsive to a toggle signal for providing a host flip bit indicative of the parity of the number of times the host modulus counter has received a reset signal;
wherein the disc pointer means comprises:
  a disc modulus counter for receiving the host sector count signals and responsive to reset signals for repetitively providing a modular arithmetic indication of the number of disc sector count signals received by the disc pointer means; and
  a disc counter flip flop responsive to a toggle signal for providing a disc flip bit indicative of the parity of the number of times the disc modulus counter has received a reset signal;
and wherein the buffer manager further comprises:
  host reset means for resetting the host modulus counter and toggling the host counter flip flop each time the host modulus counter counts to the modular arithmetic value corresponding to said number of sectors storable by the buffer segment; and
  disc reset means for resetting the disc modulus counter and toggling the disc counter flip flop each time the disc modulus counter counts to the modular arithmetic value corresponding to said number of sectors storable by the buffer segment.

9. The disc drive of claim 8 wherein the buffer manager further comprises:
- means for disabling reception of host sector count signals by the host pointer means and concurrently disabling transmission of host pause signals to the transfer coordinating means; and
- means for disabling reception of disc sector count signals by the disc pointer means and concurrently disabling transmission of disc pause signals to the transfer coordinating means.

10. The disc drive of claim 1 wherein the buffer manager further comprises:
- means for disabling reception of host sector count signals by the host pointer means and concurrently disabling transmission of host pause signals to the transfer coordinating means; and
- means for disabling reception of disc sector count signals by the disc pointer means and concurrently disabling transmission of disc pause signals to the transfer coordinating means.

* * * * *

UNITED STATES PATENT AND TRADEMARK OFFICE
CERTIFICATE OF CORRECTION

PATENT NO. : 5,276,662
DATED : January 4, 1994
INVENTOR(S) : Jimmie R. Shaver, Jr. and Dhiru Desai It is certified that error appears in the above-indentified patent and that said Letters Patent is hereby corrected as shown below:

Column 1, line 42, after "file is" insert --to--;

Column 7, line 54, after "of the" delete "of";

Column 10, line 6, delete "mode" and substitute therefor --model--;

Column 17, line 19, after "is" insert --to--;

Column 20, line 39, after "host" insert --modulus counter 270, beginning with a reset is to count--;

Column 23, line 43, delete "cock" and substitute therefor --clock--;

Column 28, line 21, delete "that" and substitute therefor --than--;

Column 29, line 46, delete "remained" and substitute therefor --remain--; and

UNITED STATES PATENT AND TRADEMARK OFFICE
CERTIFICATE OF CORRECTION

PATENT NO. : 5,276,662
DATED : January 4, 1994
INVENTOR(S) : Jimmie R. Shaver, Jr. and Dhiru Desai It is certified that error appears in the above-indentified patent and that said Letters Patent is hereby corrected as shown below:

Column 30, line 66, delete "indicating" and substitute therefor —indicative—.

Signed and Sealed this

Fifteenth Day of November, 1994

Attest:

BRUCE LEHMAN

Attesting Officer      Commissioner of Patents and Trademarks